United States Patent
Shoa Hassani Lashdan et al.

(10) Patent No.: US 11,558,621 B2
(45) Date of Patent: Jan. 17, 2023

(54) SELECTIVE MOTION-COMPENSATED FRAME INTERPOLATION

(71) Applicant: QUALCOMM Incorporated, San Diego, CA (US)

(72) Inventors: Alireza Shoa Hassani Lashdan, Burlington (CA); Arshia Ershadi, Richmond Hill (CA); Darren Gnanapragasam, Aurora (CA)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 17/219,080

(22) Filed: Mar. 31, 2021

(65) Prior Publication Data

US 2022/0321889 A1   Oct. 6, 2022

(51) Int. Cl.
| | | |
|---|---|---|
| H04N 7/12 | (2006.01) | |
| H04N 19/137 | (2014.01) | |
| H04N 19/172 | (2014.01) | |
| H04N 19/513 | (2014.01) | |
| H04N 19/587 | (2014.01) | |

(52) U.S. Cl.
CPC ......... *H04N 19/137* (2014.11); *H04N 19/172* (2014.11); *H04N 19/513* (2014.11); *H04N 19/587* (2014.11)

(58) Field of Classification Search
CPC .. H04N 19/137; H04N 19/172; H04N 19/513; H04N 19/58
USPC ..................................................... 375/240.02
See application file for complete search history.

(56) References Cited

U.S. PATENT DOCUMENTS

| | | | |
|---|---|---|---|
| 6,442,203 B1 | 8/2002 | Demos | |
| 6,963,614 B2 | 11/2005 | Hazra et al. | |
| 7,408,986 B2* | 8/2008 | Winder | H04N 5/145 |
| | | | 348/E7.071 |
| 8,184,200 B1* | 5/2012 | Biswas | H04N 19/176 |
| | | | 348/452 |
| 8,619,198 B1 | 12/2013 | Andreev | |
| 2003/0202780 A1* | 10/2003 | Dumm | H04N 21/426 |
| | | | 348/E5.077 |
| 2008/0025390 A1 | 1/2008 | Shi et al. | |

(Continued)

OTHER PUBLICATIONS

International Search Report and Written Opinion—PCT/US2022/070914—ISA/EPO—dated Jun. 22, 2022, pp. 1-10.

*Primary Examiner* — Gims S Philippe
(74) *Attorney, Agent, or Firm* — Moore IP

(57) ABSTRACT

A device includes one or more processors configured to execute instructions to obtain motion data indicating estimated motion between a first frame and a second frame of an input sequence of image frames, and to identify, based on the motion data, any frame regions of the first frame that indicate motion greater than a motion threshold. The one or more processors are also configured to determine, based on the motion data, a motion metric associated with the identified frame regions, and to perform a determination, based on the motion metric and a size metric associated with the identified frame regions, whether to use motion-compensated frame interpolation to generate an intermediate frame. The one or more processors are further configured to generate the intermediate frame based on the determination, and to generate an output sequence of image frames that includes the intermediate frame between the first frame and the second frame.

30 Claims, 10 Drawing Sheets

(56) References Cited

U.S. PATENT DOCUMENTS

| | | | |
|---|---|---|---|
| 2009/0147853 A1 | 6/2009 | Dane et al. | |
| 2009/0310679 A1* | 12/2009 | Chang | H04N 7/014 |
| | | | 375/E7.104 |
| 2011/0141349 A1* | 6/2011 | Albuz | H04N 5/145 |
| | | | 348/E7.003 |
| 2020/0118244 A1* | 4/2020 | Croxford | G06T 1/20 |

* cited by examiner

SELECTIVE MOTION-COMPENSATED FRAME INTERPOLATION

I. FIELD

The present disclosure is generally related to selective motion-compensated frame interpolation.

II. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

Such computing devices often incorporate functionality to playout a video stream. For example, the video stream may represent video content received (e.g., downloaded) from another device. A reduced frame rate of the video to meet transmission bandwidth limitations can result in poor playback quality, such as increased jitter. Motion compensated frame interpolation is used at the playback device to increase the frame rate of video clips for smoother playback. However, frame interpolation is computationally intensive and power consumption can be high. On smaller screens, such as mobile devices, the increased playback smoothness from frame interpolation may not be perceptible for scenes that have relatively little motion.

III. SUMMARY

According to one implementation of the present disclosure, a device includes a memory and one or more processors. The memory is configured to store instructions.

The one or more processors are configured to execute the instructions to obtain motion data indicating estimated motion between a first frame and a second frame of an input sequence of image frames. The one or more processors are also configured to execute the instructions to identify, based on the motion data, any frame regions of the first frame that indicate motion greater than a motion threshold. The one or more processors are further configured to execute the instructions to determine, based on the motion data, a motion metric associated with the identified frame regions. The one or more processors are also configured to execute the instructions to perform a determination, based on the motion metric and a size metric associated with the identified frame regions, whether to use motion-compensated frame interpolation to generate an intermediate frame. The one or more processors are further configured to execute the instructions to generate the intermediate frame based on the determination, and to generate an output sequence of image frames that includes the intermediate frame between the first frame and the second frame.

According to another implementation of the present disclosure, a method includes obtaining, at a device, motion data indicating estimated motion between a first frame and a second frame of an input sequence of image frames. The method also includes identifying, based on the motion data, any frame regions of the first frame that indicate motion greater than a motion threshold. The method further includes determining, based on the motion data, a motion metric associated with the identified frame regions. The method also includes performing a determination, based on the motion metric and a size metric associated with the identified frame regions, whether to use motion-compensated frame interpolation to generate an intermediate frame. The method further includes generating, at the device, the intermediate frame based on the determination. The method also includes generating, at the device, an output sequence of image frames that includes the intermediate frame between the first frame and the second frame.

According to another implementation of the present disclosure, a non-transitory computer-readable medium includes instructions that, when executed by one or more processors, cause the one or more processors to obtain motion data indicating estimated motion between a first frame and a second frame of an input sequence of image frames. The instructions, when executed by one or more processors, also cause the one or more processors to identify, based on the motion data, any frame regions of the first frame that indicate motion greater than a motion threshold. The instructions, when executed by one or more processors, further cause the one or more processors to determine, based on the motion data, a motion metric associated with the identified frame regions. The instructions, when executed by one or more processors, also cause the one or more processors to perform a determination, based on the motion metric and a size metric associated with the identified frame regions, whether to use motion-compensated frame interpolation to generate an intermediate frame. The instructions, when executed by one or more processors, further cause the one or more processors to generate the intermediate frame based on the determination. The instructions, when executed by one or more processors, also cause the one or more processors to generate an output sequence of image frames that includes the intermediate frame between the first frame and the second frame.

According to another implementation of the present disclosure, an apparatus includes means for obtaining motion data indicating estimated motion between a first frame and a second frame of an input sequence of image frames. The apparatus also includes means for identifying, based on the motion data, any frame regions of the first frame that indicate motion greater than a motion threshold. The apparatus further includes means for determining, based on the motion data, a motion metric associated with the identified frame regions. The apparatus also includes means for performing a determination, based on the motion metric and a size metric associated with the identified frame regions, whether to use motion-compensated frame interpolation to generate an intermediate frame. The apparatus further includes means for generating the intermediate frame based on the determination. The apparatus also includes means for generating an output sequence of image frames that includes the intermediate frame between the first frame and the second frame.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Motion compensated frame interpolation is used to increase the frame rate of video clips for smoother playback. For example, a frame rate of a video stream is increased from 30 frames per second (fps) to 60 fps by inserting a motion-compensated interpolated frame between each pair of original frames. In full interpolation, the motion-compensated interpolated frame represents half of the motion depicted between the pair of original frames. For example, if an object shifts by 50 pixels to the right between a first original frame and a second original frame, the object shifts by 25 pixels to the right between the first original frame and an interpolated frame and by 25 pixels to the right between the interpolated frame and the second original frame. This results in smoother playback for scenes containing motion. However, frame interpolation is computationally intensive and power consumption can be high. On smaller screens, such as mobile devices, the increased playback smoothness from frame interpolation may not be perceptible for scenes that have relatively little motion.

Systems and methods of performing selective motion-compensated frame interpolation are disclosed. For example, a frame rate adjuster receives an input frame sequence and generates an output frame sequence based on the input frame sequence. The output frame sequence has a higher frame rate as compared to the input frame sequence. For example, the frame rate adjuster adds one or more intermediate frames to the input frame sequence to generate the output frame sequence. To illustrate, the input frame sequence includes a first frame followed by a second frame. The output frame sequence includes an intermediate frame between the first frame and the second frame.

The frame rate adjuster performs motion-compensated interpolation or frame copy to generate the intermediate frame. For example, the frame rate adjuster generates motion vectors indicating motion detected between the first frame and the second frame. The frame rate adjuster determines a motion metric (e.g., an average motion) and a size metric (e.g., a frame percentage) of regions of the first frame that correspond to greater than threshold motion. The frame rate adjuster determines whether to motion-compensated frame interpolation based on the motion metric and the size metric. For example, when a larger percentage of the first frame corresponds to higher motion, the frame adjuster performs motion-compensated frame interpolation to generate the intermediate frame. Alternatively, when the first frame corresponds to lower motion or when a smaller percentage of the first frame corresponds to higher motion, the frame adjuster performs frame copy to generate the intermediate frame.

Figure 1:
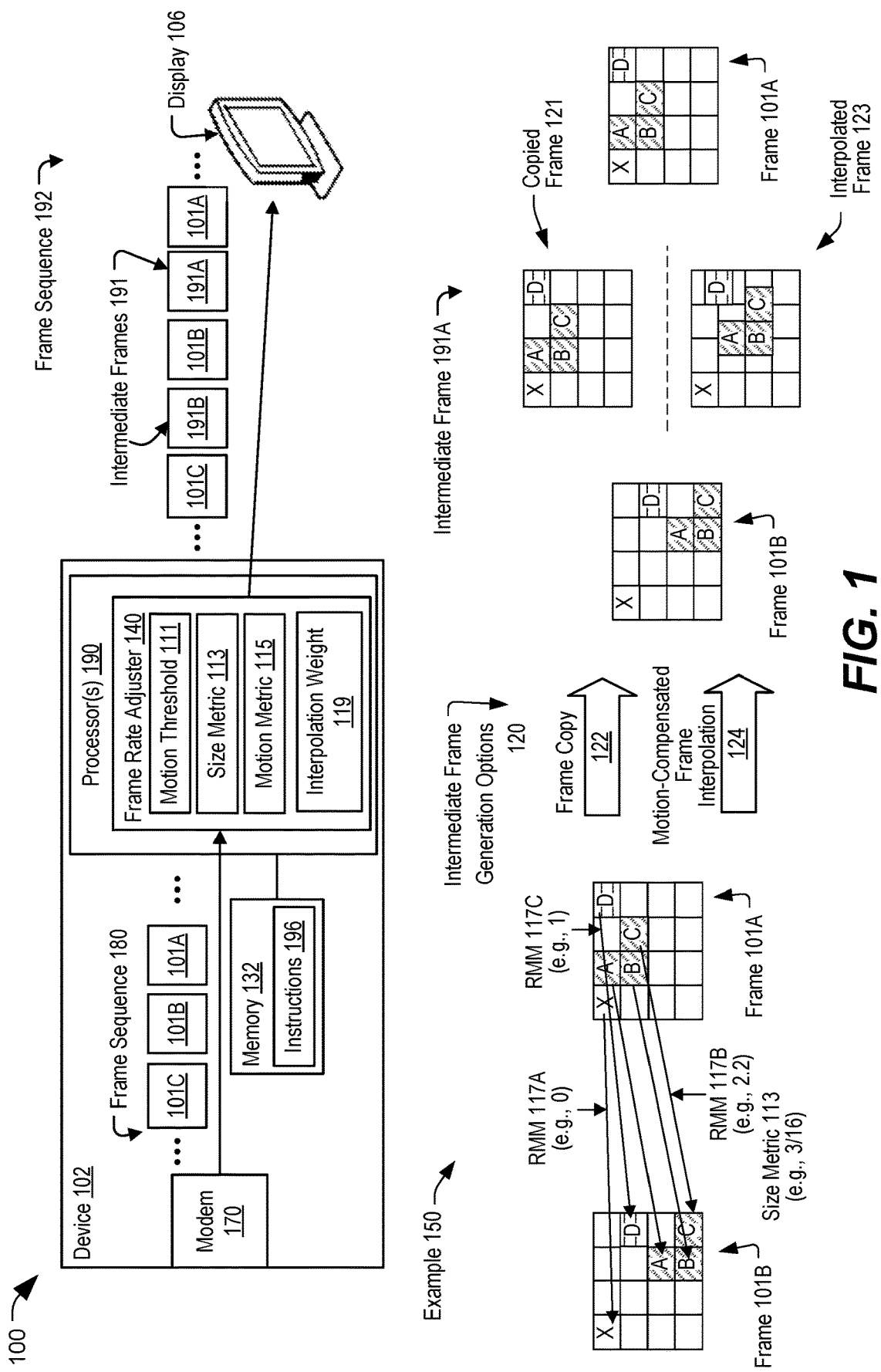
FIG. 1 is a block diagram of a particular illustrative aspect of a system operable to perform selective motion-compensated frame interpolation, in accordance with some examples of the present disclosure.

Particular aspects of the present disclosure are described below with reference to the drawings. In the description, common features are designated by common reference numbers. As used herein, various terminology is used for the purpose of describing particular implementations only and is not intended to be limiting of implementations. For example, the singular forms "a," "an," and "the" are intended to include the plural forms as well, unless the context clearly indicates otherwise. Further, some features described herein are singular in some implementations and plural in other implementations. To illustrate, FIG. 1 depicts a device 102 including one or more processors ("processor(s)" 190 of FIG. 1), which indicates that in some implementations the device 102 includes a single processor 190 and in other implementations the device 102 includes multiple processors 190.

As used herein, the terms "comprise," "comprises," and "comprising" may be used interchangeably with "include," "includes," or "including." Additionally, the term "wherein" may be used interchangeably with "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive signals (e.g., digital signals or analog signals) directly or indirectly, via one or more wires, buses, networks, etc. As used herein, "directly coupled" may include two devices that are coupled (e.g., communicatively coupled, electrically coupled, or physically coupled) without intervening components.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

Referring to FIG. 1, a particular illustrative aspect of a system configured to perform selective motion-compensated frame interpolation is disclosed and generally designated 100. The system 100 includes a device 102 that is coupled to a display device 106. The device 102 is configured to perform selective motion-compensated frame interpolation using a frame rate adjuster 140.

The device 102 includes one or more processors 190 coupled to a memory 132 and to a modem 170. The one or more processors 190 include the frame rate adjuster 140. The memory 132 is configured to store instructions 196. The one or more processors 190 are configured to execute the instructions 196 to perform one or more operations described herein. The modem 170 is configured to enable communication with one or more second devices, such as to receive a frame sequence 180 of one or more frames 101 (e.g., video frames, a photo burst, or a combination thereof). In a particular aspect, the device 102 is coupled to a display device 106. The display device 106 is described as external to the device 102 as an illustrative example. In some examples, the display device 106 is integrated in the device 102.

The frame rate adjuster 140 is configured to receive the frame sequence 180 and to output a frame sequence 192. The frame sequence 192 has a higher frame rate (e.g., more frames per second) as compared to the frame sequence 180. For example, the frame sequence 192 includes the one or more frames 101 of the frame sequence 180 and also includes one or more intermediate frames 191 interspersed between the one or more frames 101. To illustrate, the one or more frames 101 include a frame 101A followed by a frame 101B that is followed by a frame 101C. The frame rate adjuster 140 is configured to generate an intermediate frame 191A based on the frame 101A and the frame 101B and to output the intermediate frame 191A between the frame 101A and the frame 101B as in the frame sequence 192. In a particular implementation, the frame sequence 192 includes an intermediate frame 191 between each pair of consecutive frames of the one or more frames 101. For example, the frame sequence 192 includes an intermediate frame 191A between the frame 101A and the frame 101B, and an intermediate frame 191B between the frame 101B and the frame 101C. In an alternative implementation, the frame sequence 192 includes one or more intermediate frames 191 between at least one pair of consecutive frames of the one or more frames 101.

In some implementations, the device 102 corresponds to or is included in one or various types of devices. In an illustrative example, the one or more processors 190 are integrated in at least one of a mobile phone or a tablet computer device, as described with reference to FIG. 7, a wearable electronic device, as described with reference to FIG. 8, or a virtual reality headset or an augmented reality headset, as described with reference to FIG. 9. In another illustrative example, the one or more processors 190 are integrated into a vehicle, such as described further with reference to FIG. 10 and FIG. 11.

During operation, the frame rate adjuster 140 receives a frame sequence 180 of one or more frames 101 (e.g., video frames). For example, the frame rate adjuster 140 receives a frame 101A and a frame 101B of the frame sequence 180. In a particular implementation, the frame rate adjuster 140 receives the frame sequence 180 from the modem 170, the memory 132, a second device (e.g., a storage device), or a combination thereof.

In a particular aspect, the frame rate adjuster 140 obtains motion data (e.g., motion vectors) indicating estimated motion between the frame 101A and the frame 101B. In an example 150, the motion data indicates that each of regions A, B, and C of the frame 101A corresponds to a first horizontal motion (e.g., 1 pixel block to the right) and a first vertical motion (e.g., 2 pixel blocks down), a region D corresponds to no horizontal motion and a second vertical motion (e.g., 1 pixel block down), and a region X of the frame 101A corresponds to no motion (e.g., same position in each of the frame 101A and the frame 101B).

In a particular aspect, each of the regions of the frame 101A is of the same size. In an alternative aspect, at least one of the regions of the one or more frames 101 is of a different size than another region of the frame 101A. In a particular aspect, dimensions of one or more regions of the frame 101A are based on default data, a configuration setting, user input, or a combination thereof. In a particular aspect, one or more regions of the frame 101A are square-shaped, rectangle-shaped, oval-shaped, irregular-shaped, or a combination thereof. In a particular aspect, the regions of the frame 101A are non-overlapping. In an alternative aspect, the regions of the frame 101A are at least partially overlapping. In a particular aspect, a pixel block is the same size, the same shape, or both, as a region of the frame 101A. In a particular aspect, a pixel block is a different size, a different shape, or both, as a region of the frame 101A. In a particular aspect, a size, a shape, or both, of a pixel block is based on default data, a configuration setting, a user input, or a combination thereof. In a particular aspect, a pixel block includes one or more pixels of the frame 101A.

The frame rate adjuster 140 determines one or more region motion metrics (RMM) 117 of regions (e.g., frame regions) of the frame 101A. For example, the frame rate adjuster 140 determines a region motion metric 117 of each of the regions of the frame 101A based on a horizontal motion and a vertical motion (e.g., region motion metric $117=\sqrt{\text{horizontalmotion}^2+\text{verticalmotion}^2}$) of the region.

In the example 150, the frame rate adjuster 140 determines a region motion metric 117A (e.g., 0) of the region X indicating no motion. The frame rate adjuster 140 determines a region motion metric 117B (e.g., $\sqrt{1^2+2^2}=2.2$) of each of the regions A, B, and C. The frame rate adjuster 140 determines a region motion metric 117C (e.g., $\sqrt{0^2+1^2}=1$) of the region D.

The frame rate adjuster 140 identifies, based on the motion data (e.g., the one or more region motion metrics 117), any frame regions of the frame 101A that indicate motion greater than a motion threshold 111 (e.g., 2). In a particular aspect, the motion threshold 111 corresponds to default data, a configuration setting, a user input, or a combination thereof. In the example 150, the frame rate adjuster 140 in response to determining that each of the regions A, B, and C has a region motion metric 117B (e.g., 2.2) greater than the motion threshold 111 (e.g., 2), identifies the regions A, B, and C as corresponding to motion greater than the motion threshold 111. The frame rate adjuster 140, in response to determining that the region X has a region motion metric 117A (e.g., 0) that is less than or equal to the motion threshold 111 (e.g., 2) and that the region D has a region motion metric 117C (e.g., 1) that is less than or equal to the motion threshold 111, identifies the region X and the region D as corresponding to motion less than or equal to the motion threshold 111.

In a particular aspect, the frame rate adjuster 140, in response to determining that none of the regions of the frame 101A correspond to motion greater than the motion threshold 111, sets the motion metric 115 to a first motion metric value (e.g., 0) and the size metric 113 to a first size metric value (e.g., 0 percent). Alternatively, the frame rate adjuster 140, in response to identifying one or more regions of the frame 101A indicating motion greater than the motion threshold 111, determines the motion metric 115 and the size metric 113 based on the region motion metrics 117 of the identified regions.

The frame rate adjuster 140 determines the motion metric 115 based on the region motion metric 117 of each of the regions (e.g., A, B, and C) identified as indicating motion greater than the motion threshold 111, and independently of the region motion metric (e.g., the region motion metric 117A and the region motion metric 117C) of the regions (e.g., regions X and D) identified as indicating motion less than or equal to the motion threshold 111. In a particular implementation, the motion metric 115 is based on an average motion (e.g., mean, median, or mode), a maximum motion, a range of motion, or a combination thereof, indicated by the region motion metrics 117 of the regions identified as indicating motion greater than the motion threshold 111. In the example 150, the motion metric 115 corresponds to an average (e.g., (2.2+2.2+2.2)/3=2.2) of the region motion metrics 117 of the regions (e.g., A, B, and C) identified as indicating motion greater than the motion threshold 111 (e.g., 2).

The frame rate adjuster 140 determines the size metric 113 associated with the frame regions (e.g., A, B, and C) identified as indicating motion greater than the motion threshold 111 (e.g., 2). In a particular aspect, the size metric 113 is based on a combined size of the identified frame regions (e.g., A, B, and C), a percentage of the frame 101A that includes the identified frame regions (e.g., A, B, and C), or a combination thereof. In a particular example, the frame rate adjuster 140 determines the size metric 113 (e.g., 3/16=18.75%) based on a first count (e.g., 3) of the regions (e.g., A, B, C) identified as indicating motion greater than the motion threshold 111 and a second count (e.g., 16) of total regions of the frame 101A (e.g., size metric 113=first count/second count).

The frame rate adjuster 140 performs a determination, based on the size metric 113 and the motion metric 115, whether to use motion-compensated frame interpolation to generate an intermediate frame 191A, as further described with reference to FIGS. 2-3. For example, intermediate frame generation options 120 include performing motion-compensated frame interpolation 124 and one or more alternatives to the motion-compensated frame interpolation 124 (e.g., performing frame copy 122). In a particular aspect, in cases where frame regions indicating motion greater than the motion threshold 111 correspond to a relatively large proportion of the frame 101A (as indicated by the size metric 113) or correspond to relatively large motion (as indicated by the motion metric 115), the transition between the frame 101A and the frame 101B is predicted to be more noticeable during playback. In such cases, the frame rate adjuster 140 uses the motion-compensated frame interpolation 124 to increase playback smoothness. Alternatively, in cases where frame regions, if any, indicating motion greater than the motion threshold 111 correspond to a relatively small proportion of the frame 101A (as indicated by the size metric 113) or correspond to relatively small motion (as indicated by the motion metric 115), the transition between the frame 101A and the frame 101B is predicted to be less noticeable during playback. In such cases, the frame rate adjuster 140 uses the frame copy 122 to conserve resources.

The frame rate adjuster 140, in response to the determination that motion-compensated frame interpolation is to be performed, uses the motion-compensated frame interpolation 124 to generate an interpolated frame 123 as the intermediate frame 191A. For example, the frame rate adjuster 140 generates the interpolated frame 123 so that a second motion between the frame 101A and the interpolated frame 123 is based on an interpolation weight 119 applied to first motion between the frame 101A and the frame 101B. In a particular implementation, the interpolation weight 119 is based on the size metric 113 and the motion metric 115, as further described with reference to FIGS. 2-3. In a particular implementation, the interpolation weight 119 is based on a predetermined weight. In a particular aspect, the interpolation weight 119 is based on default data, a configuration setting, a user input, or a combination thereof. In a particular aspect, a first copy value (e.g., 0) of the interpolation weight 119 corresponds to a copy of the frame 101A and a second copy value (e.g., 1) of the interpolation weight 119 corresponds to a copy of the frame 101B. In a particular aspect, values of the interpolation weight 119 between the first copy value and the second copy value correspond to an interpolation. For example, a full interpolation value (e.g., 0.5) of the interpolation weight 119 corresponds to a full interpolation. As another example, a half interpolation value (e.g., 0.25) corresponds to a half interpolation.

In the example 150, the motion-compensated frame interpolation 124 corresponds to a "full interpolation" to generate the interpolated frame 123. A "full interpolation" refers to generating an interpolated frame 123 such that second motion between the interpolated frame 123 and each of the frame 101A and the frame 101B is the full interpolation value (e.g., 0.5) of the interpolation weight 119 applied to the first motion between the frame 101A and the frame 101B. For example, the first motion between the frame 101A and the frame 101B indicates a first horizontal motion (e.g., 1 pixel blocks to the right) and a first vertical motion (e.g., 2 pixel blocks down) for each of the regions A, B, and C, no horizontal motion and a second vertical motion (e.g., 1 pixel block down) for the region D, and no motion for the region X. The frame rate adjuster 140 generates the interpolated frame 123 such that the second motion between the frame 101A and the interpolated frame 123 indicates a first particular horizontal motion (e.g., 0.5*1=0.5 pixel blocks to the right) and a first particular vertical motion (e.g., 0.5*2=1 pixel block down) for each of the regions A, B, and C, no horizontal motion (e.g., 0.5*0=0) and a second particular vertical motion (e.g., 0.5*1=0.5 pixel block down) for the region D, and no motion (e.g., 0.5*0 and 0.5*0) for the region X. Playback of the interpolated frame 123 as the intermediate frame 191A between the frame 101A and the frame 101B would smooth the transition (e.g., reduce the jitter) between the frame 101A and the frame 101B.

Alternatively, the frame rate adjuster 140, in response to the determination that motion-compensated frame interpolation is not to be performed, uses an alternative to the motion-compensated frame interpolation 124 to generate the intermediate frame 191A. For example, the frame rate adjuster 140 performs the frame copy 122 to generate a copied frame 121 as the intermediate frame 191A. In the example 150, the copied frame 121 corresponds to a copy of the frame 101A. In other examples, the copied frame 121 can correspond to a copy of the frame 101B. In a particular implementation, generating the copied frame 121 corresponds to generating an additional frame based on the frame 101A (or the frame 101B). In another implementation, generating the copied frame 121 corresponds to increasing (e.g., doubling) a playout time of the frame 101A (or the frame 101B) independently of generating an additional frame. In a particular implementation, generating the copied frame 121 corresponds to including a reference to the frame 101A (or the frame 101B) twice in a playout list. Generating the copied frame 121 uses fewer resources (e.g., power, processing cycles, and time) as compared to generating the interpolated frame 123.

The frame rate adjuster 140 generates a frame sequence 192 that includes the intermediate frame 191A between the frame 101A and the frame 101B. In a particular aspect, the frame rate adjuster 140 provides the frame sequence 192 to the display device 106 for playback, stores the frame sequence 192 in the memory 132 or a storage device, provides (e.g., streams) the frame sequence 192 to another device, or a combination thereof.

The system 100 thus enables selective motion-compensated frame interpolation based on size of higher motion regions and a degree of motion indicated by the higher motion regions. For example, the frame rate adjuster 140 transitions between performing motion-compensated frame interpolation to increase playback smoothness and performing frame copy to conserve resources.

Figure 2:
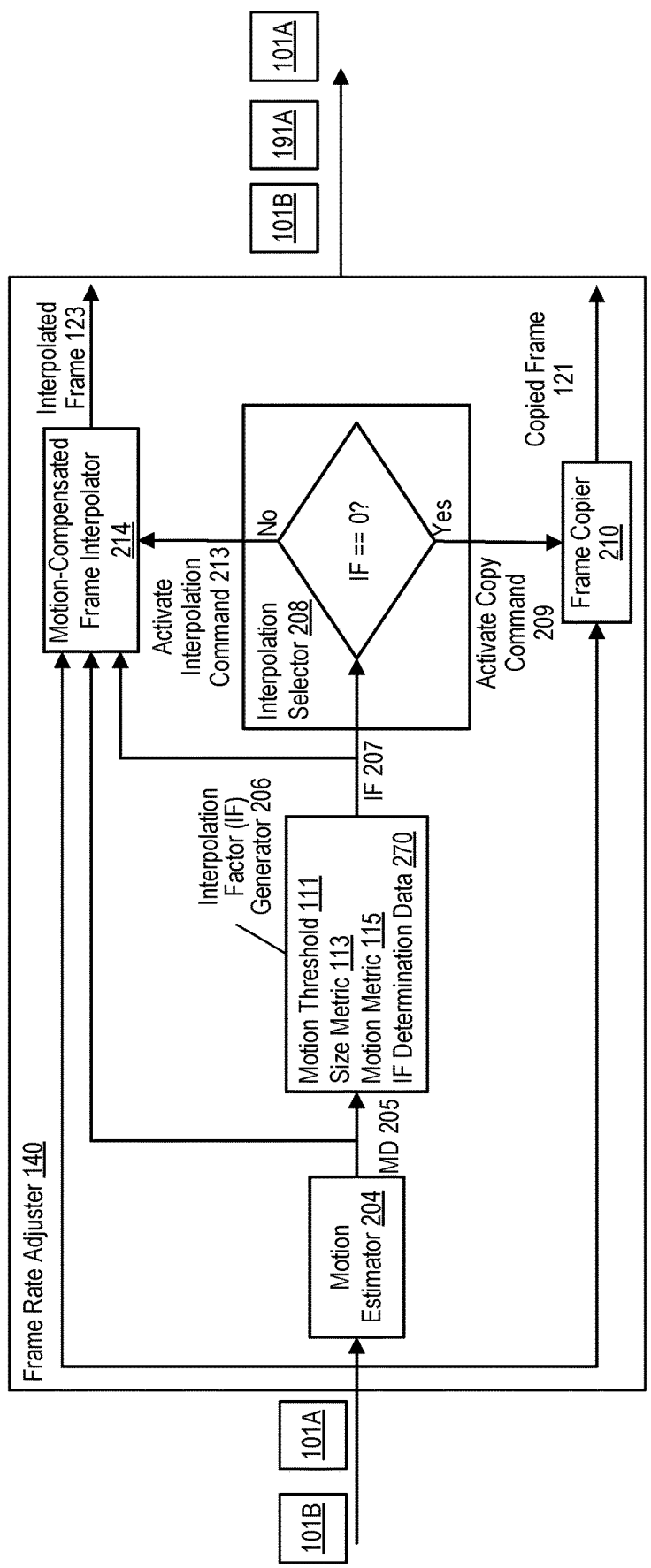
FIG. 2 is a diagram of an illustrative aspect of a frame rate adjuster of the system of FIG. 1, in accordance with some examples of the present disclosure.
Figure 3:
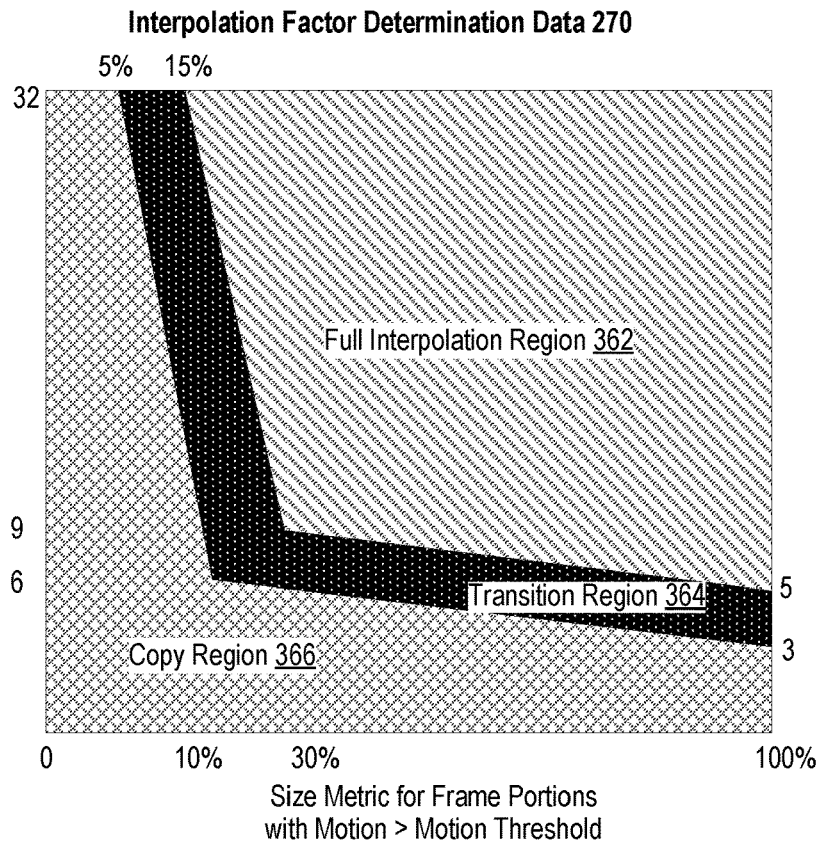
FIG. 3 is a diagram of illustrative examples of interpolation factor determination data used by the frame rate adjuster of FIG. 2, in accordance with some examples of the present disclosure.
Figure 3:
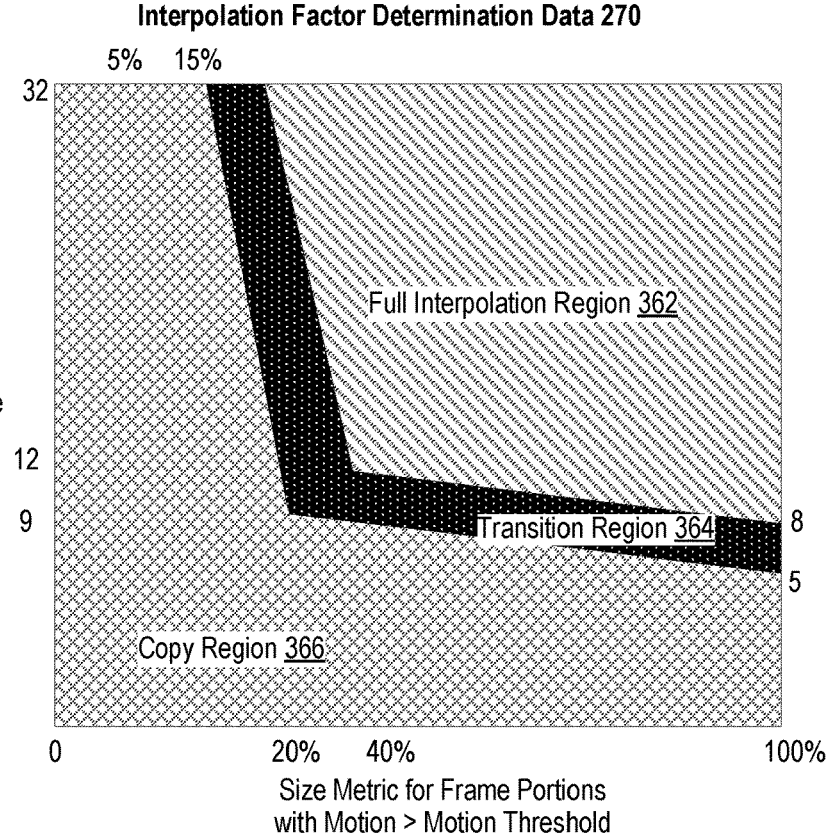

Referring to FIG. 2, an illustrative aspect of the frame rate adjuster 140 is shown. The frame rate adjuster 140 includes a motion estimator 204 coupled via an interpolation factor generator 206 to an interpolation selector 208. The interpolation selector 208 is coupled to each of a frame copier 210 and a motion-compensated frame interpolator 214.

The motion estimator 204 receives the frame sequence 180. For example, the motion estimator 204 receives the frame 101A and the frame 101B. The motion estimator 204 generates motion data (MD) 205 indicating estimated motion between pairs of consecutive frames of the frame sequence 180. For example, the motion estimator 204 generates motion data 205 (e.g., a set of motion vectors) indicating estimated motion between the frame 101A and the frame 101B. The motion estimator 204 provides the motion data 205 to each of the interpolation factor generator 206 and the motion-compensated frame interpolator 214.

The interpolation factor (IF) generator 206 determines an interpolation factor 207 based on the motion data 205. For example, the interpolation factor generator 206 determines the size metric 113 and the motion metric 115, as described with reference to FIG. 1. In a particular aspect, the interpolation factor generator 206 determines that the motion data 205 includes a set of motion vectors (e.g., 16 motion vectors) indicating the estimated motion between the frame 101A and the frame 101B. The interpolation factor generator 206 determines that a subset of the motion vectors (e.g., 3 motion vectors) indicate motion that is greater than the motion threshold 111 (e.g., 2 pixel blocks). The interpolation factor generator 206 determines the size metric 113 (e.g., 3/16=18.75 percent) as a percentage of motion vectors of the motion data 205 that indicate motion that is higher than the motion threshold 111. The interpolation factor generator 206 determines the motion metric 115 based on the motion (e.g., an average motion or a range of motion) indicated by the subset of the motion vectors (e.g., the 3 motion vectors). The interpolation factor generator 206 generates the interpolation factor 207 based on a comparison of the size metric 113 and the motion metric 115 with interpolation factor determination data 270.

In a particular aspect, the interpolation factor determination data 270 indicates a plurality of interpolation factor regions defined by ranges of size metric values, ranges of motion metric values, or a combination thereof. In FIG. 3, an example 300 of the interpolation factor determination data 270 is shown. The interpolation factor determination data 270 includes a plurality of interpolation factor regions, including a full interpolation region 362, a transition region 364, and a copy region 366. For example, the copy region 366 corresponds to small or no motion (e.g., low motion metric) indicated by small portions (e.g., low size metric) of the frame 101A where frame interpolation is likely to result in an unnoticeable increase in playback smoothness. The full interpolation region 362 corresponds to high motion (e.g., high motion metric) indicated by a large portion (e.g., high size metric) of the frame 101A where frame interpolation is likely to result in a noticeable increase in playback smoothness. The transition region 364 corresponds to high motion in a small portion of the frame 101A or small motion in a large portion of the frame 101A where frame interpolation may result in a somewhat noticeable increase in playback smoothness.

In some implementations, the interpolation factor determination data 270 includes the full interpolation region 362 and the copy region 366 and does not include any transition regions. In some implementations, the interpolation factor determination data 270 includes multiple transition regions. In a particular aspect, the interpolation factor determination data 270 is based on a configuration setting, default data, a user input, a detected context, an operation mode, a screen size, or a combination thereof. To illustrate, the example 300 of the interpolation factor determination data 270 corresponds to a first configuration setting (e.g., a resource conservation setting), a first user input (e.g., a resource conservation input), a first detected context (e.g., a lecture video), a first operation mode (e.g., a low power mode or a battery conservation mode), a first screen size (e.g., a smaller than threshold screen size), or a combination thereof, and an example 350 of the interpolation factor determination data 270 corresponds to a second configuration setting (e.g., a playback smoothness setting), a second user input (e.g., a playback smoothness input), a second detected context (e.g., a movie), a second operation mode (e.g., a charging mode, a charged mode, or a full power mode), a second screen size (e.g., a greater than or equal to threshold screen size), or a combination thereof.

In a particular aspect, the detected context includes a type of the video content of the frame sequence 180. For example, playback smoothness is more relevant for a second type of video content (e.g., a movie) than a first type of video content (e.g., a lecture). In a particular aspect, the detected context includes a calendar event associated with the frame sequence 180, with a playback time of the frame sequence 180, or both. For example, playback smoothness is more relevant for a second type of calendar events (e.g., an advertising campaign presentation) than for a first type of calendar events (e.g., working out). In a particular aspect, the detected context includes an amount of movement of the display device 106. For example, playback smoothness is less relevant when the frame sequence 192 is played back while the display device 106 is moving (e.g., the display device 106 is integrated into a virtual reality headset that is playing back the frame sequence 192 while a user of the virtual reality headset is running).

In a particular aspect, the frame rate adjuster 140 adjusts the boundaries of the regions of the interpolation factor determination data 270 based on a detected condition. For example, the detected condition is based on a configuration setting, a user input, a detected context, an operation mode, a screen size, or a combination thereof. To illustrate, the frame rate adjuster 140 shifts (e.g., towards the right, the top, or both) the boundaries of the regions of the interpolation factor determination data 270 (e.g., from the example 300 to the example 350) to increase the copy region 366 and reduce the full interpolation region 362 in response to detecting a lower power operation mode (e.g., low battery), a smaller screen size, context indicating a first type of video (e.g., a lecture), or a combination thereof.

Increasing the copy region 366 and reducing the full interpolation region 362 increases the motion threshold that has to be satisfied by the motion metric 115 and increases the size threshold that has to be satisfied by the size metric 113 to trigger using motion-compensated interpolation to generate intermediate frames. Resource consumption is reduced by increasing the likelihood of using frame copy while also enabling motion-compensated interpolation to increase playback smoothness for high motion and large frame portion motion. Alternatively, the frame rate adjuster 140 shifts (e.g., towards the left, the bottom, or both) the boundaries of the regions of the interpolation factor determination data 270 (e.g., from the example 350 to the example 300) to reduce the copy region 366 and increase the full interpolation region 362 in response to detecting a higher power operation mode (e.g., plugged into a power supply), a larger screen size, context indicating a second type of video (e.g., a movie), or a combination thereof. Reducing the copy region 366 and increasing the full interpolation region 362 decreases the motion threshold that has to be satisfied by the motion metric 115 and decreases the size threshold that has to be satisfied by the size metric 113 to trigger using motion-compensated interpolation to generate intermediate frames. Playback smoothness is increased by increasing the likelihood of using motion-compensated interpolation while also enabling frame copy to conserve resources for low motion or small frame portion motion.

Each of the plurality of regions of the interpolation factor determination data 270 corresponds to a particular interpolation factor value. For example, the copy region 366 corresponds to a first interpolation factor value (e.g., 0) and the full interpolation region 362 corresponds to a second interpolation factor value (e.g., 1). In a particular aspect, the transition region 364 corresponds to a third interpolation factor value (e.g., 0.5).

The interpolation factor generator 206, in response to determining that the size metric 113 and the motion metric 115 correspond to (e.g., are in) a particular region of the interpolation factor determination data 270, generates the interpolation factor 207 indicating a particular interpolation factor value that corresponds to the particular region. For example, the interpolation factor generator 206, in response to determining that the size metric 113 and the motion metric 115 correspond to (e.g., are in) the copy region 366, generates the interpolation factor 207 indicating the first interpolation factor value (e.g., 0) that corresponds to the copy region 366. Alternatively, the interpolation factor generator 206 generates the interpolation factor 207 indicating the second interpolation factor value (e.g., 1) in response to determining that the size metric 113 and the motion metric 115 correspond to (e.g., are in) the full interpolation region 362. In a particular implementation, the interpolation factor generator 206 generates the interpolation factor 207 indicating the third interpolation factor value (e.g., 0.5) in response to determining that the size metric 113 and the motion metric 115 are in the transition region 364. The first interpolation factor value (e.g., 0) indicates that motion-compensated frame interpolation is not to be performed. The second interpolation factor value (e.g., 1) indicates that full interpolation is to be performed. The third interpolation factor value (e.g., 0.5) indicates that partial interpolation is to be performed.

The interpolation factor determination data 270 indicating a plurality of interpolation factor regions defined by ranges of size metric values and ranges of motion metric values is provided as an illustrative example. In some examples, the interpolation factor determination data 270 indicates a plurality of interpolation factor regions defined by ranges of size metric values and independent of ranges of motion metric values. In these examples, the interpolation factor generator 206, in response to determining that the size metric 113 corresponds to (e.g., is in) a particular region of the interpolation factor determination data 270, generates the interpolation factor 207 indicating a particular interpolation factor value that corresponds to the particular region. In other examples, the interpolation factor determination data 270 indicates a plurality of interpolation factor regions defined by ranges of motion metric values and independent of ranges of size metric values. In these examples, the interpolation factor generator 206, in response to determining that the motion metric 115 corresponds to (e.g., is in) a particular region of the interpolation factor determination data 270, generates the interpolation factor 207 indicating a particular interpolation factor value that corresponds to the particular region.

Returning to FIG. 2, the interpolation factor generator 206 provides the interpolation factor 207 to each of the interpolation selector 208 and the motion-compensated frame interpolator 214. The interpolation selector 208 determines, based on the interpolation factor 207, whether to use motion-compensated frame interpolation to generate the intermediate frame 191A. For example, the determination whether to use motion-compensated frame interpolation is based on whether the interpolation factor 207 satisfies an interpolation criterion (e.g., whether interpolation factor 207 is equal to 0). To illustrate, the interpolation selector 208, in response to determining that the interpolation factor 207 satisfies the interpolation criterion (e.g., the interpolation factor 207 is not equal to 0), determines that motion-compensated frame interpolation is to be used and sends an activate interpolation command 213 to the motion-compensated frame interpolator 214. Alternatively, the interpolation selector 208, in response to determining that the interpolation factor 207 fails to satisfy the interpolation criterion (e.g., the interpolation factor 207 is equal to 0) determines that motion-compensated frame interpolation is not to be used (e.g., an alternative to the motion-compensated frame interpolation is to be used) and sends an activate copy command activate copy command 209 to frame copier 210.

The motion-compensated frame interpolator 214, in response to receiving the activate interpolation command 213, performs motion-compensated frame interpolation on the frame 101A and the frame 101B to generate the interpolated frame 123 as the intermediate frame 191A, as further described with reference to FIG. 5. For example, the motion-compensated frame interpolator 214 performs the motion-compensated frame interpolation based on the motion data 205, the interpolation factor 207, the frame 101A, the frame 101B, or a combination thereof.

The frame copier 210, in response to receiving the activate copy command 209, generates the copied frame 121 by copying one of the frame 101A or the frame 101B, as described with reference to FIG. 1. The frame rate adjuster 140 outputs the copied frame 121 as the intermediate frame 191A. For example, the frame rate adjuster 140 outputs the frame 191 between the frame 101A and the frame 101B in the frame sequence 192.

In a first implementation, the interpolation factor determination data 270 does not include any transition regions. In this implementation, the frame rate adjuster 140 switches between a full interpolation and a copy to generate intermediate frames. In a second implementation, the interpolation factor determination data 270 includes at least one transition region. In this implementation, the frame rate adjuster 140 transitions via a partial interpolation between a full interpolation and a copy to generate intermediate frames when movement in the frame sequence 180 transitions via the transition region 364 between the full interpolation region 362 and the copy region 366.

The frame rate adjuster 140 thus enables selective motion-compensated frame interpolation based on the size metric 113 and the motion metric 115. In a particular aspect, the criteria for selecting motion-compensated frame interpolation can be changed dynamically by adjusting the interpolation factor determination data 270 based on a detected condition (e.g., a configuration setting, a user input, a detected context, an operation mode, a screen size, or a combination thereof).

In a particular implementation, the device 102 includes an always-on power domain and a second power domain, such as an on-demand power domain. In some implementations, a first stage of the frame rate adjuster 140 is configured to operate in an always-on mode, and a second stage of the frame rate adjuster 140 is configured to operate in an on-demand mode. In a particular aspect, the motion estimator 204, the interpolation factor generator 206, the interpolation selector 208, the frame copier 210, or a combination thereof, are included in the first stage of the frame rate adjuster 140, and the motion-compensated frame interpolator 214 is included in the second stage of the frame rate adjuster 140.

The first stage is configured to generate the activate interpolation command 213 to initiate one or more operations at the second stage. In an example, the activate interpolation command 213 is configured to transition the second power domain from a low-power mode to an active mode to activate one or more components of the second stage. For example, the interpolation selector 208 may include or be coupled to power management circuitry, clock circuitry, head switch or foot switch circuitry, buffer control circuitry, or any combination thereof. The interpolation selector 208 may be configured to initiate powering-on of the second stage, such as by selectively applying or raising a voltage of a power supply of the second stage, of the second power domain, or both. As another example, the interpolation selector 208 may be configured to selectively gate or un-gate a clock signal to the second stage, such as to prevent or enable circuit operation without removing a power supply.

The interpolated frame 123 generated by the second stage is provided to the frame rate adjuster 140. The frame rate adjuster 140 is configured to output the interpolated frame 123 as the intermediate frame 191A. By selectively activating the second stage based on a result of processing frames at the first stage of the frame rate adjuster 140, overall power consumption associated with performing selective motion-compensated frame interpolation, or both, may be reduced.

Figure 4:
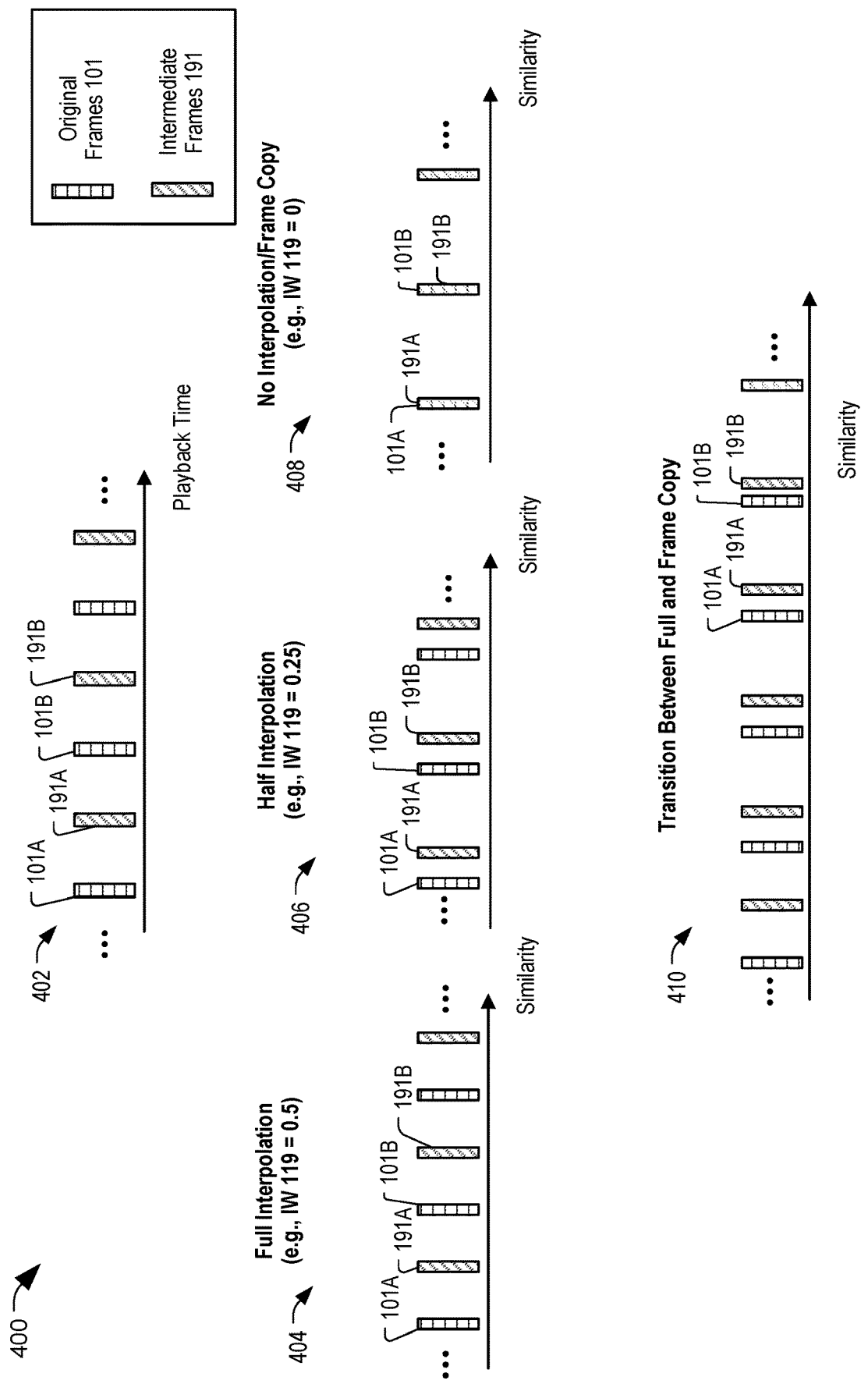
FIG. 4 is a diagram of illustrative examples of frames generated by the system of FIG. 1, in accordance with some examples of the present disclosure.

Referring to FIG. 4, a diagram 400 of illustrative examples of frames generated by the system 100 of FIG. 1 is shown. An example 402 indicates a constant playback speed of the frames of the frame sequence 192 (e.g., the one or more frames 101 interspersed with one or more intermediate frames 191).

A full interpolation example 404 indicates that each of the one or more intermediate frames 191 is halfway in similarity between a preceding frame 101 and a subsequent frame 101. For example, the frame rate adjuster 140 generates the intermediate frame 191A so that a second motion between the intermediate frame 191A and each of the frame 101A and the frame 101B corresponds to half of the first motion between the frame 101A and the frame 101B, as described with reference to the motion-compensated frame interpolation 124 of FIG. 1. The full interpolation example 404 represents applying the full interpolation value (e.g., 0.5) of the interpolation weight (IW) 119 to the first motion to generate the intermediate frame 191A.

A half interpolation example 406 indicates that each of the one or more intermediate frames 191 is closer in similarity to a preceding frame 101 than to a subsequent frame 101. For example, the frame rate adjuster 140 generates the intermediate frame 191A so that a second motion between the intermediate frame 191A and the frame 101A corresponds to a quarter of the first motion and a third motion between the intermediate frame 191A and the frame 101B corresponds to three quarters of the first motion. The half interpolation example 406 represents applying the half interpolation value (e.g., 0.25) of the interpolation weight (IW) 119 to the first motion to generate the intermediate frame 191A.

A no interpolation example 408 indicates that each of the one or more intermediate frames 191 is a copy of a preceding frame 101. For example, the frame rate adjuster 140 generates the intermediate frame 191A as a copy of the frame 101A. The no interpolation example 408 represents generating the copied frame 121 as the intermediate frame 191A.

A transition example 410 indicates that earlier intermediate frames 191 are halfway in similarity between a preceding frame 101 and a subsequent frame 101, middle intermediate frames 191 are closer to the preceding frame 101 than to the subsequent frame 101, and later intermediate frames 191 are a copy of the preceding frame 101. For example, the frame rate adjuster 140 transitions via partial interpolation between full interpolation and copy to generate the one or more intermediate frames 191. The transition example 410 represents updating the interpolation weight 119 from the full interpolation value (e.g., 0.5) to the no interpolation value (e.g., 0) as one or more intermediate frames 191 are generated. Transitioning between full interpolation via partial interpolation to copying is less noticeable during playback as compared to switching between full interpolation and copying.

Figure 5:
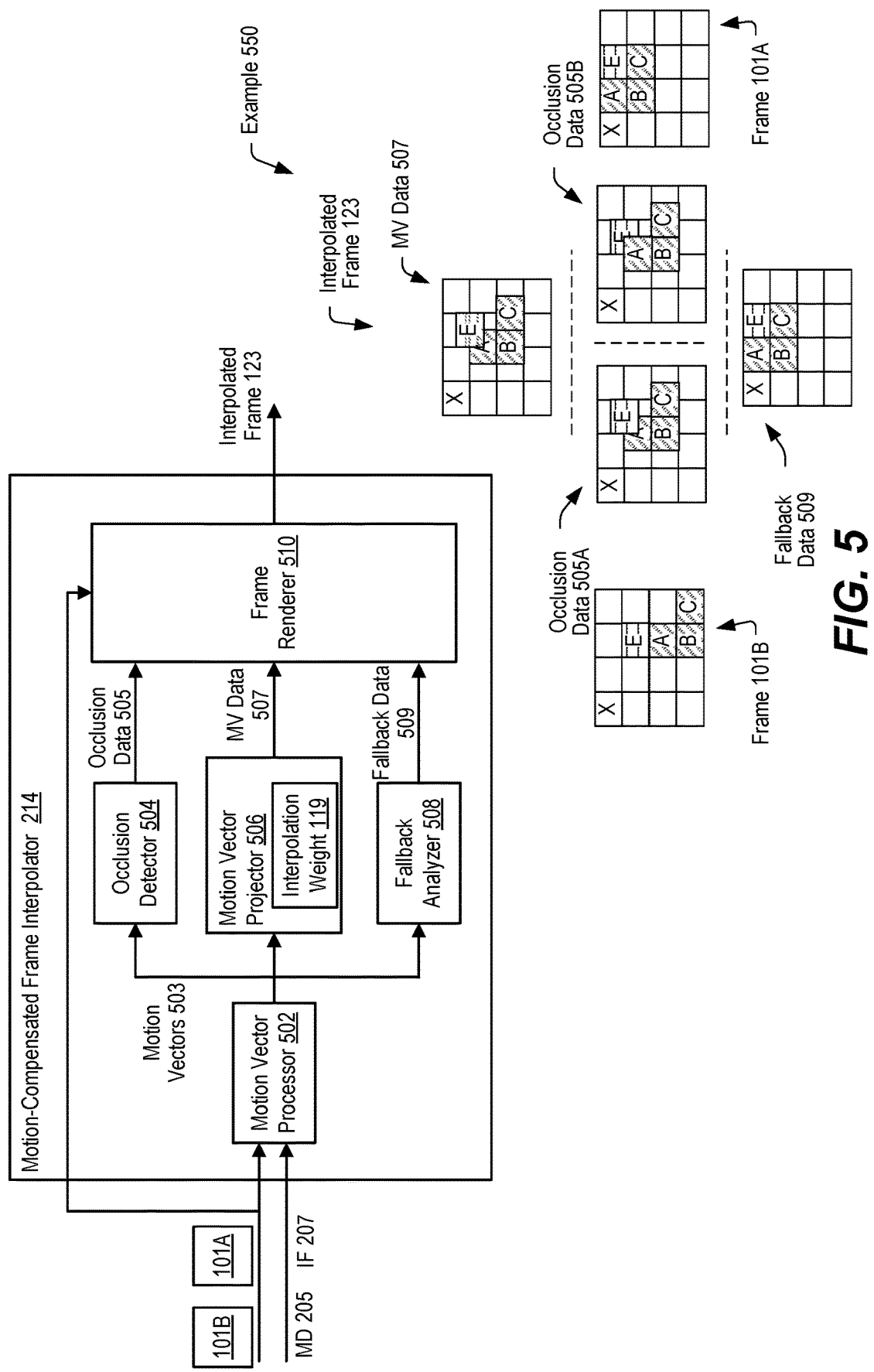
FIG. 5 is a diagram of an illustrative aspect of a motion-compensated frame interpolator of the frame rate adjuster of FIG. 2, in accordance with some examples of the present disclosure.

Referring to FIG. 5, an illustrative aspect of the motion-compensated frame interpolator 214 is shown. The motion-compensated frame interpolator 214 includes a motion vector processor 502 coupled, via an occlusion detector 504, a motion vector projector 506, a fallback analyzer 508, or a combination thereof, to a frame renderer 510.

In a first implementation, the motion-compensated frame interpolator 214 determines the interpolation weight 119 based on a predetermined weight (e.g., 0.5). For example, the motion-compensated frame interpolator 214 performs interpolation (e.g., full interpolation) corresponding to the predetermined weight (e.g., 0.5) independently of the interpolation factor 207. In a second implementation, the motion-compensated frame interpolator 214 determines the interpolation weight 119 based at least in part on the interpolation factor 207. For example, the motion-compensated frame interpolator 214 applies a predetermined factor (e.g., 0.5) to the interpolation factor 207 to determine the interpolation weight 119. To illustrate, a full interpolation value (e.g., 1) of the interpolation factor 207 corresponds to a full interpolation value (e.g., 0.5) of the interpolation weight 119. A half interpolation value (e.g., 0.5) of the interpolation factor 207 corresponds to a half interpolation value (e.g., 0.25) of the interpolation weight 119.

In a particular aspect, the interpolation weight 119 has the same value (e.g., 0.5) in both the first implementation and the second implementation when the interpolation factor 207 has the full interpolation value. The interpolation weight 119 has a different value in the second implementation than in the first implementation when the interpolation factor 207 has a value (e.g., a half interpolation value) other than the full interpolation value.

The motion vector processor 502 generates motion vectors 503 based on the motion data 205, the frame 101A, and the frame 101B. For example, the motion vector processor 502 performs motion vector post processing and refinement to generate the motion vectors 503. The motion vector processor 502 provides the motion vectors 503 to the occlusion detector 504, the motion vector projector 506, the fallback analyzer 508, or a combination thereof.

The motion vector projector 506 generates motion vector data 507 based on the interpolation weight 119. For example, the motion vector projector 506, in response to determining that a first motion vector of the motion vectors 503 indicates a first pixel shift (e.g., 2 pixel blocks) for the region A in a first direction (e.g., down) between the frame 101A and the frame 101B, generates the motion vector data 507 including a second motion vector indicating a second pixel shift (e.g., 1 pixel block) in the first direction between the frame 101A and the interpolated frame 123. The second pixel shift is based on applying the interpolation weight 119 (e.g., 0.5) to the first pixel shift (e.g., second pixel shift=the interpolation weight 119*first pixel shift). The motion vector projector 506 provides the motion vector data 507 to the frame renderer 510.

In an example 550, the frame 101A includes a region E. A movement of the region E between the frame 101A and the frame 101B crosses paths with a movement of the region A between the frame 101A and the frame 101B. The motion vector data 507 indicates that the region E overlaps the region A and both the region E and the region A are visible in the interpolated frame 123. For example, one of the region E or the region A corresponds to glass of a window.

The occlusion detector 504 detects a possible occlusion in response to determining that the motion vectors 503, the motion vector data 507, or both, indicate that the movement of the region E between the frame 101A and the frame 101B crosses paths with the movement of the region A between the frame 101A and the frame 101B. The occlusion detector 504 generates occlusion data 505 in response to detecting the possible occlusion. For example, the occlusion data 505 includes occlusion data 505A (e.g., motion vectors) corresponding to the region E partially blocking the region A in the interpolated frame 123. As another example, the occlusion data 505 includes occlusion data 505B (e.g., motion vectors) corresponding to the region A at least partially blocks the region A in the interpolated frame 123. The occlusion detector 504 provides the occlusion data 505 to the frame renderer 510.

The fallback analyzer 508 in response to determining that the motion vectors 503, the motion vector data 507, or both, indicate a greater than threshold count of crossed paths, generates fallback data 509 corresponding to a fallback of the interpolated frame 123 to the frame 101A. For example, the fallback data 509 indicates the interpolated frame 123 as a copy of the frame 101A. The fallback analyzer 508 provides the fallback data 509 to the frame renderer 510.

The frame renderer 510 generates the interpolated frame 123 based on the motion vector data 507, the occlusion data 505, the fallback data 509, the frame 101A, the frame 101B, or a combination thereof. For example, the frame renderer 510, in response to determining that the occlusion data 505 indicates that no possible occlusions are detected, applies the motion vector data 507 (e.g., motion vectors) to the frame 101A to generate the interpolated frame 123. Alternatively, the frame renderer 510, in response to determining that the occlusion data 505 indicates that fewer than a threshold count of occlusions are detected, applies the occlusion data 505 to the frame 101A to generate the interpolated frame 123. For example, the frame renderer 510 selects the occlusion data 505A or the occlusion data 505B using various occlusion resolution techniques and applies the selected one of the occlusion data 505A or the occlusion data 505B to the frame 101A to generate the interpolated frame 123. In a particular aspect, the frame renderer 510, in response to determining that the fallback data 509 indicates that greater than or equal to the threshold count of occlusions are detected, copies the frame 101A as the interpolated frame 123.

The motion-compensated frame interpolator 214 thus enables generating the interpolated frame 123 based on the interpolation weight 119. The motion-compensated frame interpolator 214 enables adjustments to the interpolated frame 123 based on detected occlusions, including falling back to the frame 101A.

Figure 6:
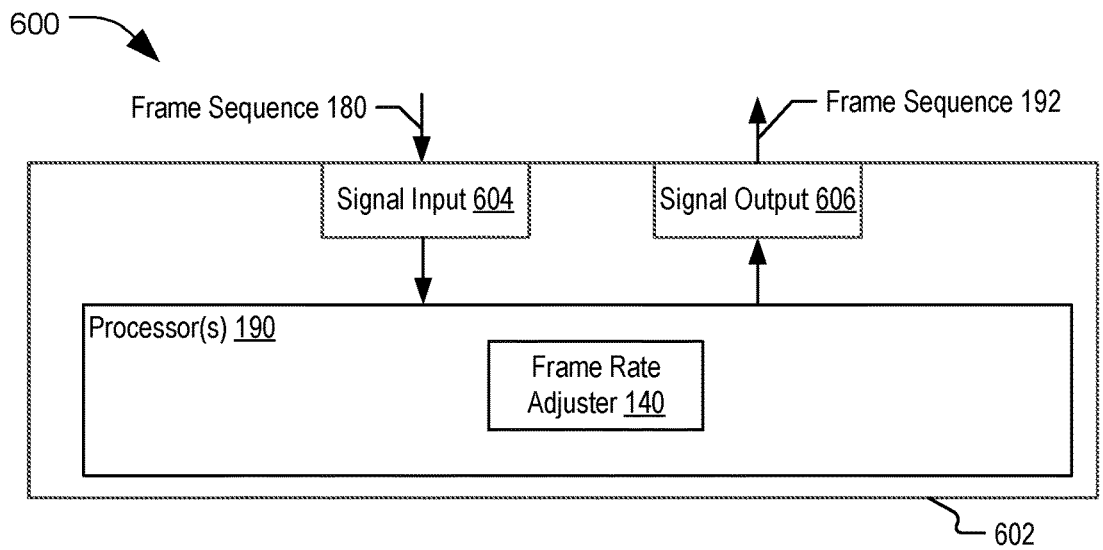
FIG. 6 illustrates an example of an integrated circuit operable to perform selective motion-compensated frame interpolation, in accordance with some examples of the present disclosure.
Figure 10:
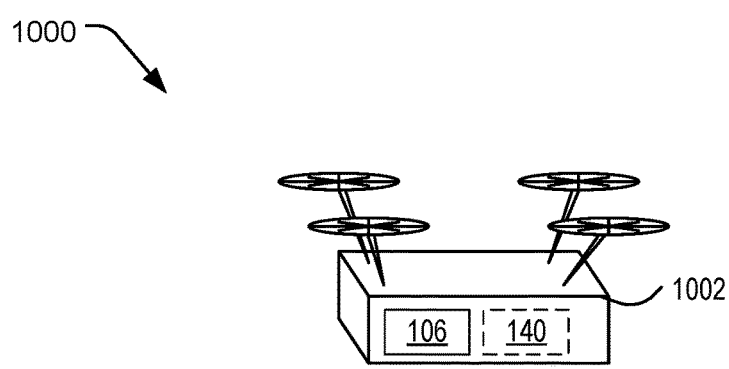
FIG. 10 is a diagram of a first example of a vehicle operable to perform selective motion-compensated frame interpolation, in accordance with some examples of the present disclosure.
Figure 11:
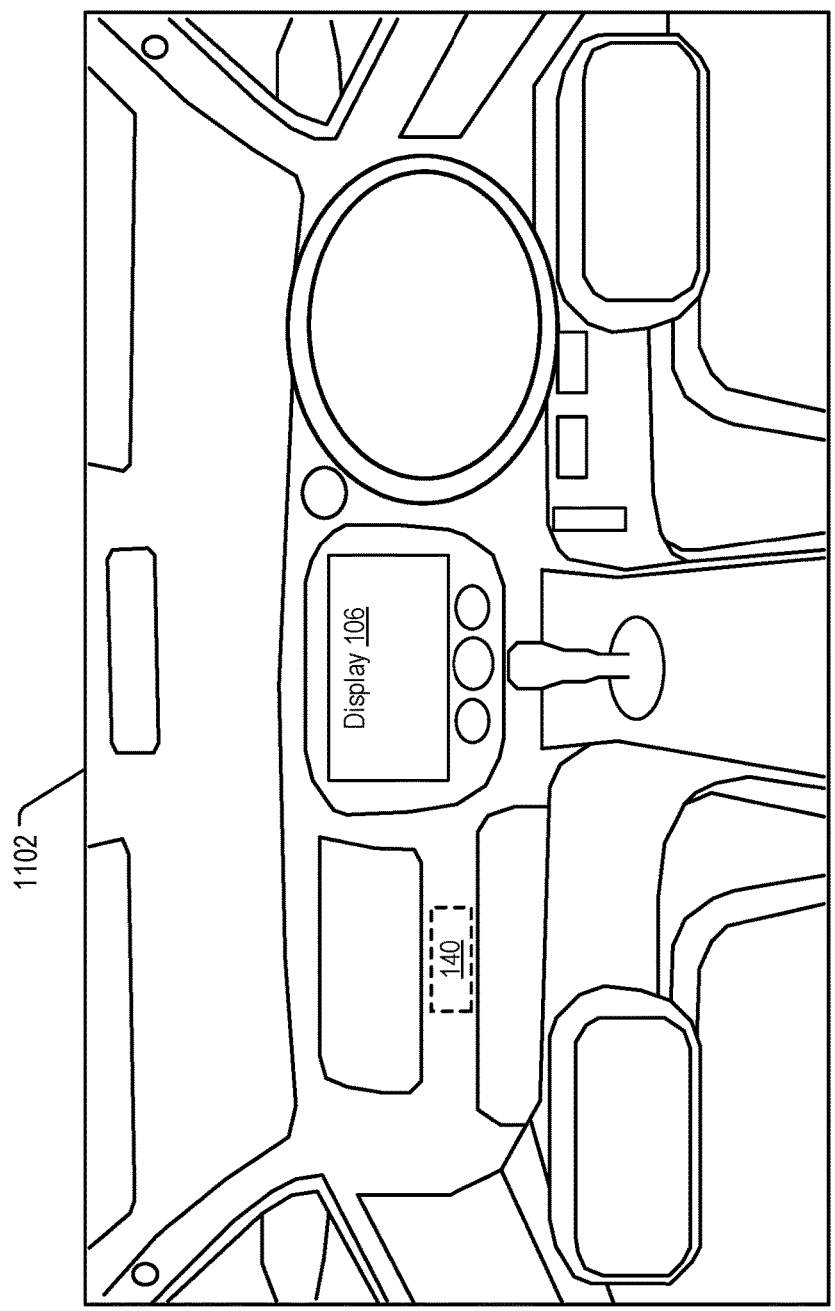
FIG. 11 is a diagram of a second example of a vehicle operable to perform selective motion-compensated frame interpolation, in accordance with some examples of the present disclosure.

FIG. 6 depicts an implementation 600 of the device 102 as an integrated circuit 602 that includes the one or more processors 190. The integrated circuit 602 also includes a signal input 604, such as one or more bus interfaces, to enable the frame sequence 180 to be received for processing. The integrated circuit 602 also includes a signal output 606, such as a bus interface, to enable sending of an output signal, such as the frame sequence 192. The integrated circuit 602 enables implementation of selective motion-compensated frame interpolation as a component in a system, such as a mobile phone or tablet as depicted in FIG. 7, a wearable electronic device as depicted in FIG. 8, a virtual reality headset or an augmented reality headset as depicted in FIG. 9, or a vehicle as depicted in FIG. 10 or FIG. 11.

Figure 7:
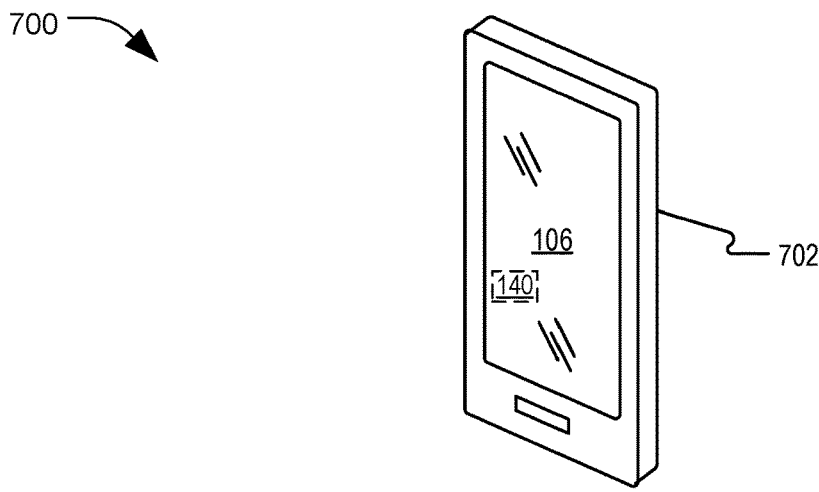
FIG. 7 is a diagram of a mobile device operable to perform selective motion-compensated frame interpolation, in accordance with some examples of the present disclosure.

FIG. 7 depicts an implementation 700 in which the device 102 includes a mobile device 702, such as a phone or tablet, as illustrative, non-limiting examples. The mobile device 702 includes the display device 106 (e.g., a display screen). Components of the one or more processors 190, including the frame rate adjuster 140, are integrated in the mobile device 702 and are illustrated using dashed lines to indicate internal components that are not generally visible to a user of the mobile device 702. In a particular example, the frame rate adjuster 140 operates to generate the frame sequence 192, which is then processed to perform one or more operations at the mobile device 702, such as to launch a graphical user interface or otherwise display the frame sequence 192.

Figure 8:
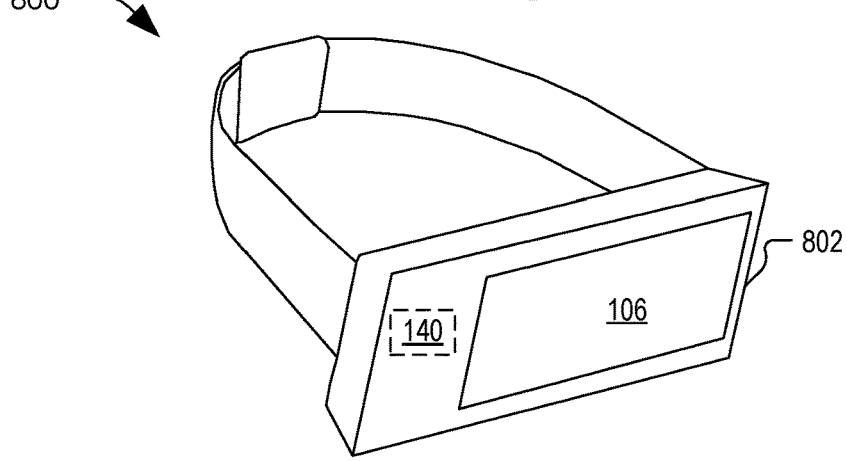
FIG. 8 is a diagram of a wearable electronic device operable to perform selective motion-compensated frame interpolation, in accordance with some examples of the present disclosure.

FIG. 8 depicts an implementation 800 in which the device 102 includes a wearable electronic device 802, illustrated as a "smart watch." The frame rate adjuster 140 is integrated into the wearable electronic device 802. In a particular example, the frame rate adjuster 140 operates to generate the frame sequence 192, which is then processed to perform one or more operations at the wearable electronic device 802, such as to launch a graphical user interface or otherwise display the frame sequence 192 at the display device 106 (e.g., display screen) of the wearable electronic device 802. In a particular example, the wearable electronic device 802 includes a haptic device that provides a haptic notification (e.g., vibrates) in response to detection that the frame sequence 192 is ready for display. For example, the haptic notification can cause a user to look at the wearable electronic device 802 to see the frame sequence 192. The wearable electronic device 802 can thus alert a user with a hearing impairment or a user wearing a headset that the video data is detected.

Figure 9:
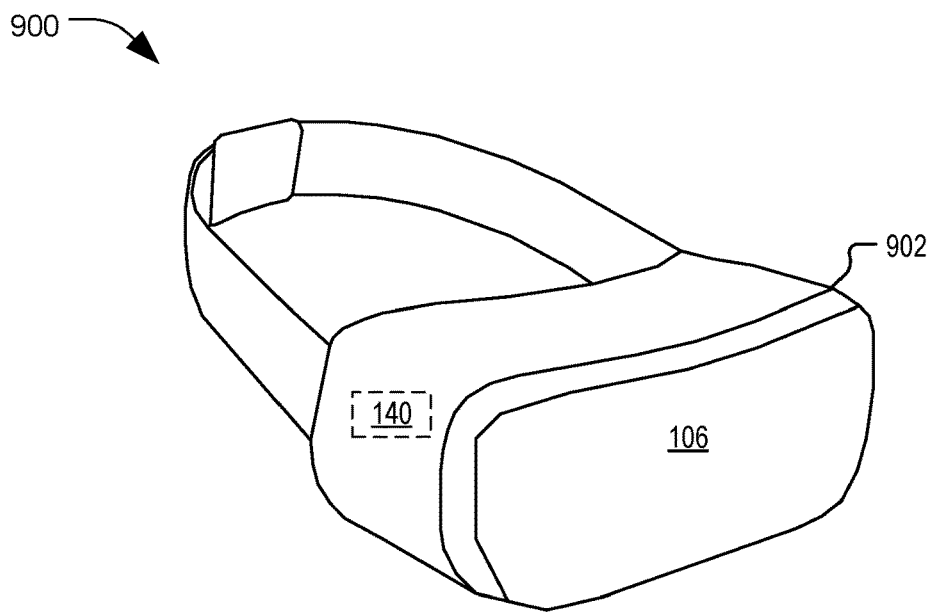
FIG. 9 is a diagram of a headset, such as a virtual reality or augmented reality headset, operable to perform selective motion-compensated frame interpolation, in accordance with some examples of the present disclosure.

FIG. 9 depicts an implementation 900 in which the device 102 includes a portable electronic device that corresponds to a virtual reality, augmented reality, or mixed reality headset 902. The frame rate adjuster 140 is integrated into the headset 902. A visual interface device (e.g., the display device 106) is positioned in front of the user's eyes to enable display of augmented reality or virtual reality images or scenes to the user while the headset 902 is worn. In a particular example, the visual interface device is configured to display the frame sequence 192.

FIG. 10 depicts an implementation 1000 in which the device 102 corresponds to, or is integrated within, a vehicle 1002, illustrated as a manned or unmanned aerial device (e.g., a package delivery drone). The frame rate adjuster 140, the display device 106 (e.g., a display screen), or both, are integrated into the vehicle 1002. The frame sequence 192 can be displayed on the display device 106, such as for delivery communication, an advertisement, installation instructions, or a combination thereof, for a recipient.

FIG. 11 depicts another implementation 1100 in which the device 102 corresponds to, or is integrated within, a vehicle 1102, illustrated as a car. The vehicle 1102 includes the one or more processors 190 including the frame rate adjuster 140. In a particular implementation, in response to generating the frame sequence 192 via operation of the frame rate adjuster 140, the frame sequence 192 is displayed via the display device 106 (e.g., a display screen).

Figure 12:
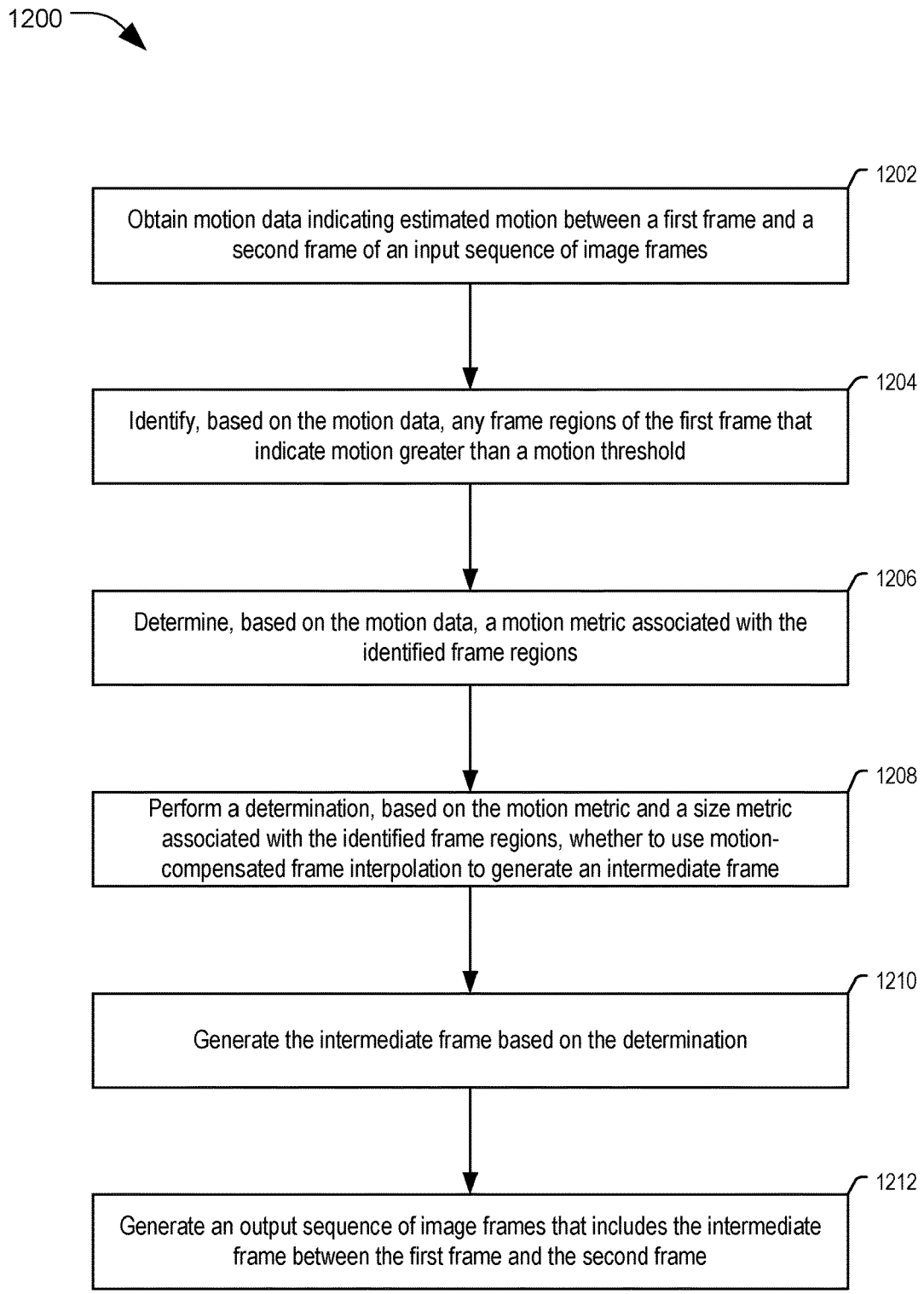
FIG. 12 is a diagram of a particular implementation of a method of selective motion-compensated frame interpolation that may be performed by the device of FIG. 1, in accordance with some examples of the present disclosure.

Referring to FIG. 12, a particular implementation of a method 1200 of selective motion-compensated frame interpolation is shown. In a particular aspect, one or more operations of the method 1200 are performed by at least one of the frame rate adjuster 140, the one or more processors 190, the device 102, the system 100 of FIG. 1, the motion estimator 204, the interpolation factor generator 206, the interpolation selector 208, the frame copier 210, the motion-compensated frame interpolator 214 of FIG. 2, the motion vector processor 502, the occlusion detector 504, the motion vector projector 506, the fallback analyzer 508, the frame renderer 510 of FIG. 5, or a combination thereof.

The method 1200 includes obtaining motion data indicating estimated motion between a first frame and a second frame of an input sequence of image frames, at 1202. For example, the motion estimator 204 of FIG. 2 obtains the motion data 205 (e.g., motion vectors) indicating estimated motion between the frame 101A and the frame 101B of the frame sequence 180 (e.g., image frames, video frames, a photo burst, or a combination thereof), as described with reference to FIG. 2.

The method 1200 also includes identifying, based on the motion data, any frame regions of the first frame that indicate motion greater than a motion threshold, at 1204. For example, the interpolation factor generator 206 of FIG. 2 identifies, based on the motion data 205, any frame regions of the frame 101A that indicate motion greater than the motion threshold 111, as described with reference to FIG. 2.

The method 1200 further includes determining, based on the motion data, a motion metric associated with the identified frame regions, at 1206. For example, the interpolation factor generator 206 of FIG. 2 determines, based on the motion data 205, the motion metric 115 associated with the identified frame regions, as described with reference to FIG. 2.

The method 1200 also includes performing a determination, based on the motion metric and a size metric associated with the identified frame regions, whether to use motion-compensated frame interpolation to generate an intermediate frame, at 1208. For example, the interpolation factor generator 206 of FIG. 2 generates the interpolation factor 207 based on the motion threshold 111 and the size metric 113, as described with reference to FIG. 2. The interpolation selector 208 performs a determination, based on the interpolation factor 207, whether to use motion-compensated frame interpolation to generate the intermediate frame 191A, as described with reference to FIG. 2.

The method 1200 further includes generating the intermediate frame based on the determination, at 1210. For example, the interpolation selector 208 of FIG. 2, based on the interpolation factor 207, generates one of the activate copy command 209 or the activate interpolation command 213, as described with reference to FIG. 2. In a particular aspect, the frame copier 210, in response to receiving the activate copy command 209, generates the copied frame 121 as the intermediate frame 191A, as described with reference to FIG. 2. In an alternative aspect, the motion-compensated frame interpolator 214, in response to receiving the activate interpolation command 213, generates the interpolated frame 123 as the intermediate frame 191A, as described with reference to FIG. 2.

The method 1200 also includes generating an output sequence of image frames that includes the intermediate frame between the first frame and the second frame, at 1212.

For example, the frame rate adjuster 140 of FIG. 1 generates the frame sequence 192 that includes the intermediate frame 191A between the frame 101A and the frame 101B, as described with reference to FIG. 1.

The method 1200 thus enables selective motion-compensated frame interpolation based on the size metric 113 (e.g., corresponding to size of higher motion regions) and the motion metric 115 (e.g., corresponding to a degree of motion indicated by the higher motion regions). For example, the frame rate adjuster 140 transitions between performing motion-compensated frame interpolation to increase playback smoothness and performing frame copy to conserve resources.

The method 1200 of FIG. 12 may be implemented by a field-programmable gate array (FPGA) device, an application-specific integrated circuit (ASIC), a processing unit such as a central processing unit (CPU), a DSP, a controller, another hardware device, firmware device, or any combination thereof. As an example, the method 1200 of FIG. 12 may be performed by a processor that executes instructions, such as described with reference to FIG. 13.

Figure 13:
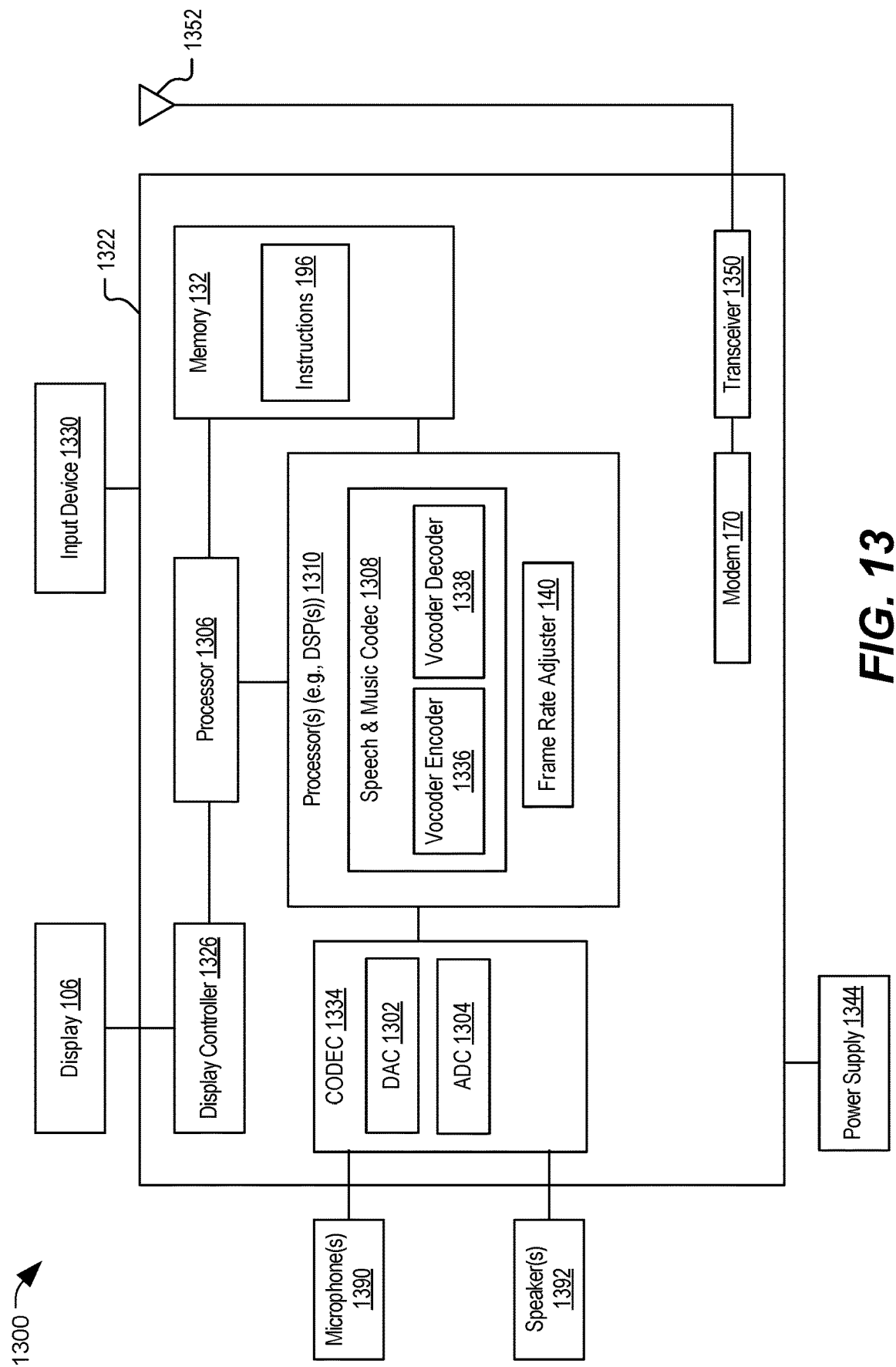
FIG. 13 is a block diagram of a particular illustrative example of a device that is operable to perform selective motion-compensated frame interpolation, in accordance with some examples of the present disclosure.

Referring to FIG. 13, a block diagram of a particular illustrative implementation of a device is depicted and generally designated 1300. In various implementations, the device 1300 may have more or fewer components than illustrated in FIG. 13. In an illustrative implementation, the device 1300 may correspond to, include, or be included within the device 102. In an illustrative implementation, the device 1300 may perform one or more operations described with reference to FIGS. 1-12.

In a particular implementation, the device 1300 includes a processor 1306 (e.g., a central processing unit (CPU)). The device 1300 may include one or more additional processors 1310 (e.g., one or more DSPs). In a particular aspect, the one or more processors 190 of FIG. 1 correspond to the processor 1306, the processors 1310, or a combination thereof. The processors 1310 may include a speech and music coder-decoder (CODEC) 1308 that includes a voice coder ("vocoder") encoder 1336, a vocoder decoder 1338, or both. The processors 1310 include the frame rate adjuster 140.

The device 1300 may include the memory 132 and a CODEC 1334. The memory 132 may include the instructions 196, that are executable by the one or more additional processors 1310 (or the processor 1306) to implement the functionality described with reference to the frame rate adjuster 140. The device 1300 may include the modem 170 coupled, via a transceiver 1350, to an antenna 1352.

The device 1300 may include the display device 106 coupled to a display controller 1326. One or more speakers 1392 and one or more microphones 1390 may be coupled to the CODEC 1334. The CODEC 1334 may include a digital-to-analog converter (DAC) 1302, an analog-to-digital converter (ADC) 1304, or both. In a particular implementation, the CODEC 1334 may receive analog signals from the one or more microphones 1390, convert the analog signals to digital signals using the analog-to-digital converter 1304, and provide the digital signals to the speech and music codec 1308. The speech and music codec 1308 may process the digital signals. In a particular implementation, the speech and music codec 1308 may provide digital signals to the CODEC 1334. The CODEC 1334 may convert the digital signals to analog signals using the digital-to-analog converter 1302 and may provide the analog signals to the one or more speakers 1392.

In a particular implementation, the device 1300 may be included in a system-in-package or system-on-chip device 1322. In a particular implementation, the memory 132, the processor 1306, the processors 1310, the display controller 1326, the CODEC 1334, and the modem 170 are included in a system-in-package or system-on-chip device 1322. In a particular implementation, an input device 1330 and a power supply 1344 are coupled to the system-on-chip device 1322. Moreover, in a particular implementation, as illustrated in FIG. 13, the display device 106, the input device 1330, the one or more speakers 1392, the one or more microphones 1390, the antenna 1352, and the power supply 1344 are external to the system-on-chip device 1322. In a particular implementation, each of the display device 106, the input device 1330, the one or more speakers 1392, the one or more microphones 1390, the antenna 1352, and the power supply 1344 may be coupled to a component of the system-on-chip device 1322, such as an interface or a controller.

The device 1300 may include a smart speaker, a speaker bar, a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, a vehicle, a headset, an augmented reality headset, a virtual reality headset, an aerial vehicle, a home automation system, a voice-activated device, a wireless speaker and voice activated device, a portable electronic device, a car, a computing device, a communication device, an internet-of-things (IoT) device, a virtual reality (VR) device, a base station, a mobile device, or any combination thereof.

In conjunction with the described implementations, an apparatus includes means for obtaining motion data indicating estimated motion between a first frame and a second frame of an input sequence of image frames. For example, the means for obtaining motion data can correspond to the frame rate adjuster 140, the one or more processors 190, the device 102, the system 100 of FIG. 1, the motion estimator 204 of FIG. 2, the processor 1306, the processors 1310, one or more other circuits or components configured to obtain motion data, or any combination thereof.

The apparatus also includes means for identifying, based on the motion data, any frame regions of the first frame that indicate motion greater than a motion threshold. For example, the means for identifying can correspond to the frame rate adjuster 140, the one or more processors 190, the device 102, the system 100 of FIG. 1, the interpolation factor generator 206 of FIG. 2, the processor 1306, the processors 1310, one or more other circuits or components configured to identify any frame regions that indicate motion greater than the motion threshold, or any combination thereof.

The apparatus further includes means for determining, based on the motion data, a motion metric associated with the identified frame regions. For example, the means for determining the motion metric can correspond to the frame rate adjuster 140, the one or more processors 190, the device 102, the system 100 of FIG. 1, the interpolation factor generator 206 of FIG. 2, the processor 1306, the processors 1310, one or more other circuits or components configured to determine the motion metric, or any combination thereof.

The apparatus also includes means for performing a determination, based on the motion metric and a size metric associated with the identified frame regions, whether to use motion-compensated frame interpolation to generate an intermediate frame. For example, the means for performing the determination whether to use motion-compensated frame interpolation can correspond to the frame rate adjuster 140, the one or more processors 190, the device 102, the system 100 of FIG. 1, the interpolation factor generator 206, the interpolation selector 208 of FIG. 2, the processor 1306, the processors 1310, one or more other circuits or components configured to perform the determination whether to use motion-compensated frame interpolation, or any combination thereof.

The apparatus further includes means for generating the intermediate frame based on the determination. For example, the means for generating the intermediate frame can correspond to the frame rate adjuster 140, the one or more processors 190, the device 102, the system 100 of FIG. 1, the frame copier 210, the motion-compensated frame interpolator 214 of FIG. 2, the processor 1306, the processors 1310, one or more other circuits or components configured to generate the intermediate frame, or any combination thereof.

The apparatus also includes means for generating an output sequence of image frames that includes the intermediate frame between the first frame and the second frame. For example, the means for generating the output sequence can correspond to the frame rate adjuster 140, the one or more processors 190, the device 102, the system 100 of FIG. 1, the frame copier 210, the motion-compensated frame interpolator 214 of FIG. 2, the processor 1306, the processors 1310, one or more other circuits or components configured to generate the output sequence, or any combination thereof.

In a particular aspect, the apparatus also includes means for generating an interpolation factor based on the size metric and the motion metric, where the determination whether to use the motion-compensated frame interpolation to generate the intermediate frame is based on whether the interpolation factor satisfies an interpolation criterion. For example, the means for generating the interpolation factor can correspond to the frame rate adjuster 140, the one or more processors 190, the device 102, the system 100 of FIG. 1, the interpolation factor generator 206 of FIG. 2, the processor 1306, the processors 1310, one or more other circuits or components configured to generate the interpolation factor, or any combination thereof.

In a particular aspect, the apparatus further includes means for receiving the input sequence of image frames. For example, the means for receiving can correspond to the modem 170, the frame rate adjuster 140, the one or more processors 190, the device 102, the system 100 of FIG. 1, the motion estimator 204, the frame copier 210, the motion-compensated frame interpolator 214 of FIG. 2, the processor 1306, the processors 1310, the transceiver 1350, the antenna 1352, one or more other circuits or components configured to receive the input sequence of image frames, or any combination thereof.

In some implementations, a non-transitory computer-readable medium (e.g., a computer-readable storage device, such as the memory 132) includes instructions (e.g., the instructions 196) that, when executed by one or more processors (e.g., the one or more processors 1310 or the processor 1306), cause the one or more processors to obtain motion data (e.g., the motion data 205) indicating estimated motion between a first frame (e.g., the frame 101A) and a second frame (e.g., the frame 101B) of an input sequence of image frames (e.g., the frame sequence 180). The instructions, when executed by the one or more processors, also cause the one or more processors to identify, based on the motion data, any frame regions of the first frame that indicate motion greater than a motion threshold (e.g., the motion threshold 111). The instructions, when executed by the one or more processors, further cause the one or more processors to determine, based on the motion data, a motion metric (e.g., the motion metric 115) associated with the identified frame regions. The instructions, when executed by the one or more processors, also cause the one or more processors to perform a determination, based on the motion metric and a size metric (e.g., the size metric 113) associated with the identified frame regions, whether to use motion-compensated frame interpolation to generate an intermediate frame (e.g., the intermediate frame 191A). The instructions, when executed by the one or more processors, further cause the one or more processors to generate the intermediate frame based on the determination. The instructions, when executed by the one or more processors, also cause the one or more processors to generate an output sequence of image frames (e.g., the frame sequence 192) that includes the intermediate frame between the first frame and the second frame.

Particular aspects of the disclosure are described below in various sets of interrelated clauses:

According to Clause 1, a device includes: a memory configured to store instructions; and one or more processors configured to execute the instructions to: obtain motion data indicating estimated motion between a first frame and a second frame of an input sequence of image frames; identify, based on the motion data, any frame regions of the first frame that indicate motion greater than a motion threshold; determine, based on the motion data, a motion metric associated with the identified frame regions; perform a determination, based on the motion metric and a size metric associated with the identified frame regions, whether to use motion-compensated frame interpolation to generate an intermediate frame; generate the intermediate frame based on the determination; and generate an output sequence of image frames that includes the intermediate frame between the first frame and the second frame.

Clause 2 includes the device of Clause 1, wherein the motion metric is based on an average motion, a maximum motion, a range of motion, or a combination thereof, associated with the identified frame regions.

Clause 3 includes the device of Clause 1 or Clause 2, wherein the motion metric is based on an average motion associated with the identified frame regions.

Clause 4 includes the device of any of Clause 1 to Clause 3, wherein the motion metric is based on a maximum motion associated with the identified frame regions.

Clause 5 includes the device of any of Clause 1 to Clause 4, wherein the motion metric is based on a range of motion associated with the identified frame regions.

Clause 6 includes the device of any of Clause 1 to Clause 5, wherein the size metric is based on a combined size of the identified frame regions, a count of the identified frame regions, a percentage of the first frame that includes the identified frame regions, or a combination thereof.

Clause 7 includes the device of any of Clause 1 to Clause 6, wherein the size metric is based on a combined size of the identified frame regions.

Clause 8 includes the device of any of Clause 1 to Clause 7, wherein the size metric is based on a count of the identified frame regions.

Clause 9 includes the device of any of Clause 1 to Clause 8, wherein the size metric is based on a percentage of the first frame that includes the identified frame regions.

Clause 10 includes the device of any of Clause 1 to Clause 9, wherein the one or more processors are configured to generate an interpolation factor based on the size metric and the motion metric, and wherein the determination whether to use the motion-compensated frame interpolation to generate the intermediate frame is based on whether the interpolation factor satisfies an interpolation criterion.

Clause 11 includes the device of Clause 10, wherein the one or more processors are further configured to generate the interpolation factor based on a comparison of the size metric and the motion metric with interpolation factor determination data.

Clause 12 includes the device of Clause 11, wherein the interpolation factor determination data is based on a configuration setting, default data, a user input, a detected context, an operation mode, a screen size, or a combination thereof.

Clause 13 includes the device of Clause 11 or Clause 12, wherein the interpolation factor determination data is based on a configuration setting.

Clause 14 includes the device of any of Clause 11 to Clause 13, wherein the interpolation factor determination data is based on default data.

Clause 15 includes the device of any of Clause 11 to Clause 14, wherein the interpolation factor determination data is based on a user input.

Clause 16 includes the device of any of Clause 11 to Clause 15, wherein the interpolation factor determination data is based on a detected context.

Clause 17 includes the device of any of Clause 11 to Clause 16, wherein the interpolation factor determination data is based on an operation mode.

Clause 18 includes the device of any of Clause 11 to Clause 17, wherein the interpolation factor determination data is based on a screen size.

Clause 19 includes the device of any of Clause 11 to Clause 18, wherein the interpolation factor determination data indicates a plurality of interpolation factor regions defined by ranges of size metric values and ranges of motion metric values, wherein each of the plurality of interpolation factor regions corresponds to a particular interpolation factor value, and wherein the one or more processors are further configured to, based on determining that the motion metric and the size metric are included in a particular interpolation factor region of the plurality of interpolation factor regions, generate the interpolation factor having an interpolation factor value that corresponds to the particular interpolation factor region.

Clause 20 includes the device of any of Clause 1 to Clause 9, wherein the one or more processors are configured to generate an interpolation factor based on the size metric, and wherein the determination whether to use the motion-compensated frame interpolation to generate the intermediate frame is based on whether the interpolation factor satisfies an interpolation criterion.

Clause 21 includes the device of Clause 20, wherein the one or more processors are further configured to generate the interpolation factor based on a comparison of the size metric with interpolation factor determination data.

Clause 22 includes the device of Clause 21, wherein the interpolation factor determination data is based on a configuration setting, default data, a user input, a detected context, an operation mode, a screen size, or a combination thereof.

Clause 23 includes the device of Clause 21 or Clause 22, wherein the interpolation factor determination data is based on a configuration setting.

Clause 24 includes the device of any of Clause 21 to Clause 23, wherein the interpolation factor determination data is based on default data.

Clause 25 includes the device of any of Clause 21 to Clause 24, wherein the interpolation factor determination data is based on a user input.

Clause 26 includes the device of any of Clause 21 to Clause 25, wherein the interpolation factor determination data is based on a detected context.

Clause 27 includes the device of any of Clause 21 to Clause 26, wherein the interpolation factor determination data is based on an operation mode.

Clause 28 includes the device of any of Clause 21 to Clause 27, wherein the interpolation factor determination data is based on a screen size.

Clause 29 includes the device of any of Clause 21 to Clause 28, wherein the interpolation factor determination data indicates a plurality of interpolation factor regions defined by at least ranges of size metric values, wherein each of the plurality of interpolation factor regions corresponds to a particular interpolation factor value, and wherein the one or more processors are further configured to, based on determining that the size metric is included in a particular interpolation factor region of the plurality of interpolation factor regions, generate the interpolation factor having an interpolation factor value that corresponds to the particular interpolation factor region.

Clause 30 includes the device of any of Clause 1 to Clause 9, wherein the one or more processors are configured to generate an interpolation factor based on the motion metric, and wherein the determination whether to use the motion-compensated frame interpolation to generate the intermediate frame is based on whether the interpolation factor satisfies an interpolation criterion.

Clause 31 includes the device of Clause 30, wherein the one or more processors are further configured to generate the interpolation factor based on a comparison of the motion metric with interpolation factor determination data.

Clause 32 includes the device of Clause 31, wherein the interpolation factor determination data is based on a configuration setting, default data, a user input, a detected context, an operation mode, a screen size, or a combination thereof.

Clause 33 includes the device of Clause 31 or Clause 32, wherein the interpolation factor determination data is based on a configuration setting.

Clause 34 includes the device of any of Clause 31 to Clause 33, wherein the interpolation factor determination data is based on default data.

Clause 35 includes the device of any of Clause 31 to Clause 34, wherein the interpolation factor determination data is based on a user input.

Clause 36 includes the device of any of Clause 31 to Clause 35, wherein the interpolation factor determination data is based on a detected context.

Clause 37 includes the device of any of Clause 31 to Clause 36, wherein the interpolation factor determination data is based on an operation mode.

Clause 38 includes the device of any of Clause 31 to Clause 37, wherein the interpolation factor determination data is based on a screen size.

Clause 39 includes the device of any of Clause 31 to Clause 38, wherein the interpolation factor determination data indicates a plurality of interpolation factor regions defined by at least ranges of motion metric values, wherein each of the plurality of interpolation factor regions corresponds to a particular interpolation factor value, and wherein the one or more processors are further configured to, based on determining that the motion metric is included in a particular interpolation factor region of the plurality of interpolation factor regions, generate the interpolation factor having an interpolation factor value that corresponds to the particular interpolation factor region.

Clause 40 includes the device of any of Clause 1 to Clause 39, wherein the one or more processors are configured to, in response to determining that an interpolation factor satisfies an interpolation criterion, use the motion-compensated frame interpolation to generate the intermediate frame.

Clause 41 includes the device of any of Clause 1 to Clause 40, wherein the one or more processors are configured to, in response to determining that an interpolation factor fails to satisfy an interpolation criterion, use an alternative to the motion-compensated frame interpolation to generate the intermediate frame.

Clause 42 includes the device of any of Clause 1 to Clause 41, wherein the one or more processors are configured to, in response to the determination that the motion-compensated frame interpolation is to be used to generate the intermediate frame and based on a determination that the motion data indicates a first motion between the first frame and the second frame, generate the intermediate frame so that second motion between the first frame and the intermediate frame is based on the first motion and an interpolation factor.

Clause 43 includes the device of any of Clause 1 to Clause 41, wherein the one or more processors are configured to, in response to the determination that the motion-compensated frame interpolation is to be used to generate the intermediate frame and based on a determination that the motion data indicates a first motion between the first frame and the second frame, generate the intermediate frame so that second motion between the first frame and the intermediate frame is based on a predetermined weight applied to the first motion.

Clause 44 includes the device of any of Clause 1 to Clause 43, wherein the one or more processors are configured to, in response to the determination that the motion-compensated frame interpolation is not to be used to generate the intermediate frame, generate the intermediate frame as a copy of one of the first frame or the second frame.

Clause 45 includes the device of any of Clause 1 to Clause 44, further including a modem configured to receive the input sequence of image frames.

According to Clause 46, a method includes: obtaining, at a device, motion data indicating estimated motion between a first frame and a second frame of an input sequence of image frames; identifying, based on the motion data, any frame regions of the first frame that indicate motion greater than a motion threshold; determining, based on the motion data, a motion metric associated with the identified frame regions; performing a determination, based on the motion metric and a size metric associated with the identified frame regions, whether to use motion-compensated frame interpolation to generate an intermediate frame; generating, at the device, the intermediate frame based on the determination; and generating, at the device, an output sequence of image frames that includes the intermediate frame between the first frame and the second frame.

Clause 47 includes the method of Clause 46, wherein the motion metric is based on an average motion, a maximum motion, a range of motion, or a combination thereof, associated with the identified frame regions.

Clause 48 includes the method of Clause 46 or Clause 47, wherein the motion metric is based on an average motion associated with the identified frame regions.

Clause 49 includes the method of any of Clause 46 to Clause 48, wherein the motion metric is based on a maximum motion associated with the identified frame regions.

Clause 50 includes the method of any of Clause 46 to Clause 49, wherein the motion metric is based on a range of motion associated with the identified frame regions.

Clause 51 includes the method of any of Clause 46 to Clause 50, wherein the size metric is based on a combined size of the identified frame regions, a count of the identified frame regions, a percentage of the first frame that includes the identified frame regions, or a combination thereof.

Clause 52 includes the method of any of Clause 46 to Clause 51, wherein the size metric is based on a combined size of the identified frame regions.

Clause 53 includes the method of any of Clause 46 to Clause 52, wherein the size metric is based on a count of the identified frame regions.

Clause 54 includes the method of any of Clause 46 to Clause 53, wherein the size metric is based on a percentage of the first frame that includes the identified frame regions.

Clause 55 includes the method of any of Clause 46 to Clause 54, further including generating, at the device, an interpolation factor based on the size metric and the motion metric, wherein the determination whether to use the motion-compensated frame interpolation to generate the intermediate frame is based on whether the interpolation factor satisfies an interpolation criterion.

Clause 56 includes the method of Clause 55, wherein the interpolation factor is based on a comparison of the size metric and the motion metric with interpolation factor determination data.

Clause 57 includes the method of Clause 56, wherein the interpolation factor determination data is based on a configuration setting, default data, a user input, a detected context, an operation mode, a screen size, or a combination thereof.

Clause 58 includes the method of Clause 56 or Clause 57, wherein the interpolation factor determination data is based on a configuration setting.

Clause 59 includes the method of any of Clause 56 to Clause 58, wherein the interpolation factor determination data is based on default data.

Clause 60 includes the method of any of Clause 56 to Clause 59, wherein the interpolation factor determination data is based on a user input.

Clause 61 includes the method of any of Clause 56 to Clause 60, wherein the interpolation factor determination data is based on a detected context.

Clause 62 includes the method of any of Clause 56 to Clause 61, wherein the interpolation factor determination data is based on an operation mode.

Clause 63 includes the method of any of Clause 56 to Clause 62, wherein the interpolation factor determination data is based on a screen size.

Clause 64 includes the method of any of Clause 56 to Clause 63, wherein the interpolation factor determination data indicates a plurality of interpolation factor regions defined by ranges of size metric values and ranges of motion metric values, wherein each of the plurality of interpolation factor regions corresponds to a particular interpolation factor value, wherein the motion metric and the size metric are included in a particular interpolation factor region of the plurality of interpolation factor regions, and wherein the interpolation factor has an interpolation factor value corresponding to the particular interpolation factor region.

Clause 65 includes the method of any of Clause 55 to Clause 64, further including, in response to determining that the interpolation factor satisfies the interpolation criterion, using the motion-compensated frame interpolation to generate the intermediate frame.

Clause 66 includes the method of any of Clause 55 to Clause 65, further including, in response to determining that the interpolation factor fails to satisfy the interpolation criterion, using an alternative to the motion-compensated frame interpolation to generate the intermediate frame.

Clause 67 includes the method of any of Clause 55 to Clause 66, further including, in response to the determination that the motion-compensated frame interpolation is to be used to generate the intermediate frame and based on a determination that the motion data indicates a first motion between the first frame and the second frame, generating the intermediate frame so that second motion between the first frame and the intermediate frame is based on the first motion and the interpolation factor.

Clause 68 includes the method of any of Clause 46 to Clause 54, further including generating, at the device, an interpolation factor based on the size metric, wherein the determination whether to use the motion-compensated frame interpolation to generate the intermediate frame is based on whether the interpolation factor satisfies an interpolation criterion.

Clause 69 includes the method of Clause 68, wherein the interpolation factor is based on a comparison of the size metric with interpolation factor determination data.

Clause 70 includes the method of Clause 69, wherein the interpolation factor determination data is based on a configuration setting, default data, a user input, a detected context, an operation mode, a screen size, or a combination thereof.

Clause 71 includes the method of Clause 69 or Clause 70, wherein the interpolation factor determination data is based on a configuration setting.

Clause 72 includes the method of any of Clause 69 to Clause 71, wherein the interpolation factor determination data is based on default data.

Clause 73 includes the method of any of Clause 69 to Clause 72, wherein the interpolation factor determination data is based on a user input.

Clause 74 includes the method of any of Clause 69 to Clause 73, wherein the interpolation factor determination data is based on a detected context.

Clause 75 includes the method of any of Clause 69 to Clause 74, wherein the interpolation factor determination data is based on an operation mode.

Clause 76 includes the method of any of Clause 69 to Clause 75, wherein the interpolation factor determination data is based on a screen size.

Clause 77 includes the method of any of Clause 69 to Clause 76, wherein the interpolation factor determination data indicates a plurality of interpolation factor regions defined by at least ranges of size metric values, wherein each of the plurality of interpolation factor regions corresponds to a particular interpolation factor value, wherein the size metric is included in a particular interpolation factor region of the plurality of interpolation factor regions, and wherein the interpolation factor has an interpolation factor value corresponding to the particular interpolation factor region.

Clause 78 includes the method of any of Clause 46 to Clause 54, further including generating, at the device, an interpolation factor based on the motion metric, wherein the determination whether to use the motion-compensated frame interpolation to generate the intermediate frame is based on whether the interpolation factor satisfies an interpolation criterion.

Clause 79 includes the method of Clause 78, wherein the interpolation factor is based on a comparison of the motion metric with interpolation factor determination data.

Clause 80 includes the method of Clause 79, wherein the interpolation factor determination data is based on a configuration setting, default data, a user input, a detected context, an operation mode, a screen size, or a combination thereof.

Clause 81 includes the method of Clause 79 or Clause 80, wherein the interpolation factor determination data is based on a configuration setting.

Clause 82 includes the method of any of Clause 79 to Clause 81, wherein the interpolation factor determination data is based on default data.

Clause 83 includes the method of any of Clause 79 to Clause 82, wherein the interpolation factor determination data is based on a user input.

Clause 84 includes the method of any of Clause 79 to Clause 83, wherein the interpolation factor determination data is based on a detected context.

Clause 85 includes the method of any of Clause 79 to Clause 84, wherein the interpolation factor determination data is based on an operation mode.

Clause 86 includes the method of any of Clause 79 to Clause 85, wherein the interpolation factor determination data is based on a screen size.

Clause 87 includes the method of any of Clause 79 to Clause 86, wherein the interpolation factor determination data indicates a plurality of interpolation factor regions defined by at least ranges of motion metric values, wherein each of the plurality of interpolation factor regions corresponds to a particular interpolation factor value, wherein the motion metric is included in a particular interpolation factor region of the plurality of interpolation factor regions, and wherein the interpolation factor has an interpolation factor value corresponding to the particular interpolation factor region.

Clause 88 includes the method of any of Clause 46 to Clause 87, further including, in response to determining that an interpolation factor satisfies an interpolation criterion, using the motion-compensated frame interpolation to generate the intermediate frame.

Clause 89 includes the method of any of Clause 46 to Clause 88, further including, in response to determining that an interpolation factor fails to satisfy an interpolation criterion, using an alternative to the motion-compensated frame interpolation to generate the intermediate frame.

Clause 90 includes the method of any of Clause 46 to Clause 89, further including, in response to the determination that the motion-compensated frame interpolation is to be used to generate the intermediate frame and based on a determination that the motion data indicates a first motion between the first frame and the second frame, generating the intermediate frame so that second motion between the first frame and the intermediate frame is based on the first motion and an interpolation factor.

Clause 91 includes the method of any of Clause 46 to Clause 89, further including, in response to the determination that the motion-compensated frame interpolation is to be used to generate the intermediate frame and based on a determination that the motion data indicates a first motion between the first frame and the second frame, generating the intermediate frame so that second motion between the first frame and the intermediate frame is based on a predetermined weight applied to the first motion.

Clause 92 includes the method of any of Clause 46 to Clause 91, further including, in response to the determination that the motion-compensated frame interpolation is not to be used to generate the intermediate frame, generating the intermediate frame as a copy of one of the first frame or the second frame.

According to Clause 93, a non-transitory computer-readable medium stores instructions that, when executed by one or more processors, cause the one or more processors to: obtain motion data indicating estimated motion between a first frame and a second frame of an input sequence of image frames; identify, based on the motion data, any frame regions of the first frame that indicate motion greater than a motion threshold; determine, based on the motion data, a motion metric associated with the identified frame regions; perform a determination, based on the motion metric and a size metric associated with the identified frame regions, whether to use motion-compensated frame interpolation to generate an intermediate frame; generate the intermediate frame based on the determination; and generate an output sequence of image frames that includes the intermediate frame between the first frame and the second frame.

Clause 94 includes the non-transitory computer-readable medium of Clause 93, wherein the motion metric is based on an average motion, a maximum motion, a range of motion, or a combination thereof, associated with the identified frame regions.

Clause 95 includes the non-transitory computer-readable medium of Clause 93 or Clause 94, wherein the motion metric is based on an average motion associated with the identified frame regions.

Clause 96 includes the non-transitory computer-readable medium of any of Clause 93 to Clause 95, wherein the motion metric is based on a maximum motion associated with the identified frame regions.

Clause 97 includes the non-transitory computer-readable medium of any of Clause 93 to Clause 96, wherein the motion metric is based on a range of motion associated with the identified frame regions.

Clause 98 includes the non-transitory computer-readable medium of any of Clause 93 to Clause 97, wherein the size metric is based on a combined size of the identified frame regions, a count of the identified frame regions, a percentage of the first frame that includes the identified frame regions, or a combination thereof.

Clause 99 includes the non-transitory computer-readable medium of any of Clause 93 to Clause 98, wherein the size metric is based on a combined size of the identified frame regions.

Clause 100 includes the non-transitory computer-readable medium of any of Clause 93 to Clause 99, wherein the size metric is based on a count of the identified frame regions.

Clause 101 includes the non-transitory computer-readable medium of any of Clause 93 to Clause 100, wherein the size metric is based on a percentage of the first frame that includes the identified frame regions.

Clause 102 includes the non-transitory computer-readable medium of any of Clause 93 to Clause 101, wherein the instructions, when executed by the one or more processors, further cause the one or more processors to generate an interpolation factor based on the size metric and the motion metric, wherein the determination whether to use the motion-compensated frame interpolation to generate the intermediate frame is based on whether the interpolation factor satisfies an interpolation criterion.

Clause 103 includes the non-transitory computer-readable medium of Clause 102, wherein the interpolation factor is based on a comparison of the size metric and the motion metric with interpolation factor determination data.

Clause 104 includes the non-transitory computer-readable medium of Clause 103, wherein the interpolation factor determination data is based on a configuration setting, default data, a user input, a detected context, an operation mode, a screen size, or a combination thereof.

Clause 105 includes the non-transitory computer-readable medium of Clause 103 or Clause 104, wherein the interpolation factor determination data is based on a configuration setting.

Clause 106 includes the non-transitory computer-readable medium of any of Clause 103 to Clause 105, wherein the interpolation factor determination data is based on default data.

Clause 107 includes the non-transitory computer-readable medium of any of Clause 103 to Clause 106, wherein the interpolation factor determination data is based on a user input.

Clause 108 includes the non-transitory computer-readable medium of any of Clause 103 to Clause 107, wherein the interpolation factor determination data is based on a detected context.

Clause 109 includes the non-transitory computer-readable medium of any of Clause 103 to Clause 108, wherein the interpolation factor determination data is based on an operation mode.

Clause 110 includes the non-transitory computer-readable medium of any of Clause 103 to Clause 109, wherein the interpolation factor determination data is based on a screen size.

Clause 111 includes the non-transitory computer-readable medium of any of Clause 103 to Clause 110, wherein the interpolation factor determination data indicates a plurality of interpolation factor regions defined by ranges of size metric values and ranges of motion metric values, wherein each of the plurality of interpolation factor regions corresponds to a particular interpolation factor value, wherein the motion metric and the size metric are included in a particular interpolation factor region of the plurality of interpolation factor regions, and wherein the interpolation factor has an interpolation factor value corresponding to the particular interpolation factor region.

Clause 112 includes the non-transitory computer-readable medium of any of Clause 102 to Clause 111, wherein the instructions, when executed by the one or more processors further cause the one or more processors to, in response to determining that the interpolation factor satisfies the interpolation criterion, use the motion-compensated frame interpolation to generate the intermediate frame.

Clause 113 includes the non-transitory computer-readable medium of any of Clause 102 to Clause 112, wherein the instructions, when executed by the one or more processors further cause the one or more processors to, in response to determining that the interpolation factor fails to satisfy the interpolation criterion, use an alternative to the motion-compensated frame interpolation to generate the intermediate frame.

Clause 114 includes the non-transitory computer-readable medium of any of Clause 102 to Clause 113, wherein the instructions, when executed by the one or more processors further cause the one or more processors to, in response to the determination that the motion-compensated frame interpolation is to be used to generate the intermediate frame and based on a determination that the motion data indicates a first motion between the first frame and the second frame, generate the intermediate frame so that second motion between the first frame and the intermediate frame is based on the first motion and the interpolation factor.

Clause 115 includes the non-transitory computer-readable medium of any of Clause 93 to Clause 101, wherein the instructions, when executed by the one or more processors further cause the one or more processors to generate an interpolation factor based on the size metric, wherein the determination whether to use the motion-compensated frame interpolation to generate the intermediate frame is based on whether the interpolation factor satisfies an interpolation criterion.

Clause 116 includes the non-transitory computer-readable medium of Clause 115, wherein the interpolation factor is based on a comparison of the size metric with interpolation factor determination data.

Clause 117 includes the non-transitory computer-readable medium of Clause 116, wherein the interpolation factor determination data is based on a configuration setting, default data, a user input, a detected context, an operation mode, or a screen size, or a combination thereof.

Clause 118 includes the non-transitory computer-readable medium of Clause 116 or Clause 117, wherein the interpolation factor determination data is based on a configuration setting.

Clause 119 includes the non-transitory computer-readable medium of any of Clause 116 to Clause 118, wherein the interpolation factor determination data is based on default data.

Clause 120 includes the non-transitory computer-readable medium of any of Clause 116 to Clause 119, wherein the interpolation factor determination data is based on a user input.

Clause 121 includes the non-transitory computer-readable medium of any of Clause 116 to Clause 120, wherein the interpolation factor determination data is based on a detected context.

Clause 122 includes the non-transitory computer-readable medium of any of Clause 116 to Clause 121, wherein the interpolation factor determination data is based on an operation mode.

Clause 123 includes the non-transitory computer-readable medium of any of Clause 116 to Clause 122, wherein the interpolation factor determination data is based on a screen size.

Clause 124 includes the non-transitory computer-readable medium of any of Clause 116 to Clause 123, wherein the interpolation factor determination data indicates a plurality of interpolation factor regions defined by at least ranges of size metric values, wherein each of the plurality of interpolation factor regions corresponds to a particular interpolation factor value, wherein the size metric is included in a particular interpolation factor region of the plurality of interpolation factor regions, and wherein the interpolation factor has an interpolation factor value corresponding to the particular interpolation factor region.

Clause 125 includes the non-transitory computer-readable medium of any of Clause 93 to Clause 124, wherein the instructions, when executed by the one or more processors further cause the one or more processors to generate an interpolation factor based on the motion metric, wherein the determination whether to use the motion-compensated frame interpolation to generate the intermediate frame is based on whether the interpolation factor satisfies an interpolation criterion.

Clause 126 includes the non-transitory computer-readable medium of Clause 125, wherein the interpolation factor is based on a comparison of the motion metric with interpolation factor determination data.

Clause 127 includes the non-transitory computer-readable medium of Clause 126, wherein the interpolation factor determination data is based on a configuration setting, default data, a user input, a detected context, an operation mode, a screen size, or a combination thereof.

Clause 128 includes the non-transitory computer-readable medium of Clause 126 or Clause 127, wherein the interpolation factor determination data is based on a configuration setting.

Clause 129 includes the non-transitory computer-readable medium of any of Clause 126 to Clause 128, wherein the interpolation factor determination data is based on default data.

Clause 130 includes the non-transitory computer-readable medium of any of Clause 126 to Clause 129, wherein the interpolation factor determination data is based on a user input.

Clause 131 includes the non-transitory computer-readable medium of any of Clause 126 to Clause 130, wherein the interpolation factor determination data is based on a detected context.

Clause 132 includes the non-transitory computer-readable medium of any of Clause 126 to Clause 131, wherein the interpolation factor determination data is based on an operation mode.

Clause 133 includes the non-transitory computer-readable medium of any of Clause 126 to Clause 132, wherein the interpolation factor determination data is based on a screen size.

Clause 134 includes the non-transitory computer-readable medium of any of Clause 126 to Clause 133, wherein the interpolation factor determination data indicates a plurality of interpolation factor regions defined by at least ranges of motion metric values, wherein each of the plurality of interpolation factor regions corresponds to a particular interpolation factor value, wherein the motion metric is included in a particular interpolation factor region of the plurality of interpolation factor regions, and wherein the interpolation factor has an interpolation factor value corresponding to the particular interpolation factor region.

Clause 135 includes the non-transitory computer-readable medium of any of Clause 93 to Clause 134, further including, in response to determining that an interpolation factor satisfies an interpolation criterion, using the motion-compensated frame interpolation to generate the intermediate frame.

Clause 136 includes the non-transitory computer-readable medium of any of Clause 93 to Clause 135, further including, in response to determining that an interpolation factor fails to satisfy an interpolation criterion, using an alternative to the motion-compensated frame interpolation to generate the intermediate frame.

Clause 137 includes the non-transitory computer-readable medium of any of Clause 93 to Clause 136, further including, in response to the determination that the motion-compensated frame interpolation is to be used to generate the intermediate frame and based on a determination that the motion data indicates a first motion between the first frame and the second frame, generating the intermediate frame so that second motion between the first frame and the intermediate frame is based on the first motion and an interpolation factor.

Clause 138 includes the non-transitory computer-readable medium of any of Clause 93 to Clause 136, wherein the instructions, when executed by the one or more processors further cause the one or more processors to, in response to the determination that the motion-compensated frame interpolation is to be used to generate the intermediate frame and based on a determination that the motion data indicates a first motion between the first frame and the second frame, generate the intermediate frame so that second motion between the first frame and the intermediate frame is based on a predetermined weight applied to the first motion.

Clause 139 includes the non-transitory computer-readable medium of any of Clause 93 to Clause 138, wherein the instructions, when executed by the one or more processors further cause the one or more processors to, in response to the determination that the motion-compensated frame interpolation is not to be used to generate the intermediate frame, generate the intermediate frame as a copy of one of the first frame or the second frame.

According to Clause 140, an apparatus includes: means for obtaining motion data indicating estimated motion between a first frame and a second frame of an input sequence of image frames; means for identifying, based on the motion data, any frame regions of the first frame that indicate motion greater than a motion threshold; means for determining, based on the motion data, a motion metric associated with the identified frame regions; means for performing a determination, based on the motion metric and a size metric associated with the identified frame regions, whether to use motion-compensated frame interpolation to generate an intermediate frame; means for generating the intermediate frame based on the determination; and means for generating an output sequence of image frames that includes the intermediate frame between the first frame and the second frame.

Clause 141 includes the apparatus of Clause 140, wherein the motion metric is based on an average motion, a maximum motion, a range of motion, or a combination thereof, associated with the identified frame regions.

Clause 142 includes the apparatus of Clause 140 or Clause 141, wherein the motion metric is based on an average motion associated with the identified frame regions.

Clause 143 includes the apparatus of any of Clause 140 to Clause 142, wherein the motion metric is based on a maximum motion associated with the identified frame regions.

Clause 144 includes the apparatus of any of Clause 140 to Clause 143, wherein the motion metric is based on a range of motion associated with the identified frame regions.

Clause 145 includes the apparatus of any of Clause 140 to Clause 144, wherein the size metric is based on a combined size of the identified frame regions, a count of the identified frame regions, a percentage of the first frame that includes the identified frame regions, or a combination thereof.

Clause 146 includes the apparatus of any of Clause 140 to Clause 145, wherein the size metric is based on a combined size of the identified frame regions.

Clause 147 includes the apparatus of any of Clause 140 to Clause 146, wherein the size metric is based on a count of the identified frame regions.

Clause 148 includes the apparatus of any of Clause 140 to Clause 147, wherein the size metric is based on a percentage of the first frame that includes the identified frame regions.

Clause 149 includes the apparatus of any of Clause 140 to Clause 148, further comprising means for generating an interpolation factor based on the size metric and the motion metric, wherein the determination whether to use the motion-compensated frame interpolation to generate the intermediate frame is based on whether the interpolation factor satisfies an interpolation criterion.

Clause 150 includes the apparatus of Clause 149, wherein the interpolation factor is based on a comparison of the size metric and the motion metric with interpolation factor determination data.

Clause 151 includes the apparatus of Clause 150, wherein the interpolation factor determination data is based on a configuration setting, default data, a user input, a detected context, an operation mode, a screen size, or a combination thereof.

Clause 152 includes the apparatus of Clause 150 or Clause 151, wherein the interpolation factor determination data is based on a configuration setting.

Clause 153 includes the apparatus of any of Clause 150 to Clause 152, wherein the interpolation factor determination data is based on default data.

Clause 154 includes the apparatus of any of Clause 150 to Clause 153, wherein the interpolation factor determination data is based on a user input.

Clause 155 includes the apparatus of any of Clause 150 to Clause 154, wherein the interpolation factor determination data is based on a detected context.

Clause 156 includes the apparatus of any of Clause 150 to Clause 155, wherein the interpolation factor determination data is based on an operation mode.

Clause 157 includes the apparatus of any of Clause 150 to Clause 156, wherein the interpolation factor determination data is based on a screen size.

Clause 158 includes the apparatus of any of Clause 150 to Clause 157, wherein the interpolation factor determination data indicates a plurality of interpolation factor regions defined by ranges of size metric values and ranges of motion metric values, wherein each of the plurality of interpolation factor regions corresponds to a particular interpolation factor value, and wherein the means for generating the interpolation factor, based on determining that the motion metric and the size metric are included in a particular interpolation factor region of the plurality of interpolation factor regions, generate the interpolation factor having an interpolation factor value that corresponds to the particular interpolation factor region.

Clause 159 includes the apparatus of any of Clause 149 to Clause 158, wherein the means for generating the intermediate frame, in response to determining that the interpolation factor satisfies the interpolation criterion, use the motion-compensated frame interpolation to generate the intermediate frame.

Clause 160 includes the apparatus of any of Clause 149 to Clause 159, wherein the means for generating the intermediate frame, in response to determining that the interpolation factor fails to satisfy the interpolation criterion, use an alternative to the motion-compensated frame interpolation to generate the intermediate frame.

Clause 161 includes the apparatus of any of Clause 149 to Clause 160, wherein the means for generating the intermediate frame, in response to the determination that the motion-compensated frame interpolation is to be used to generate the intermediate frame and based on a determination that the motion data indicates a first motion between the first frame and the second frame, generate the intermediate frame so that second motion between the first frame and the intermediate frame is based on the first motion and the interpolation factor.

Clause 162 includes the apparatus of any of Clause 140 to Clause 148, further including means for generating an interpolation factor based on the size metric, wherein the determination whether to use the motion-compensated frame interpolation to generate the intermediate frame is based on whether the interpolation factor satisfies an interpolation criterion.

Clause 163 includes the apparatus of Clause 162, wherein the interpolation factor is based on a comparison of the size metric with interpolation factor determination data.

Clause 164 includes the apparatus of Clause 163, wherein the interpolation factor determination data is based on a configuration setting, default data, a user input, a detected context, an operation mode, a screen size, or a combination thereof.

Clause 165 includes the apparatus of Clause 163 or Clause 164, wherein the interpolation factor determination data is based on a configuration setting.

Clause 166 includes the apparatus of any of Clause 163 to Clause 165, wherein the interpolation factor determination data is based on default data.

Clause 167 includes the apparatus of any of Clause 163 to Clause 166, wherein the interpolation factor determination data is based on a user input.

Clause 168 includes the apparatus of any of Clause 163 to Clause 167, wherein the interpolation factor determination data is based on a detected context.

Clause 169 includes the apparatus of any of Clause 163 to Clause 168, wherein the interpolation factor determination data is based on an operation mode.

Clause 170 includes the apparatus of any of Clause 163 to Clause 169, wherein the interpolation factor determination data is based on a screen size.

Clause 171 includes the apparatus of any of Clause 163 to Clause 170, wherein the interpolation factor determination data indicates a plurality of interpolation factor regions defined by at least ranges of size metric values, wherein each of the plurality of interpolation factor regions corresponds to a particular interpolation factor value, wherein the size metric is included in a particular interpolation factor region of the plurality of interpolation factor regions, and wherein the interpolation factor has an interpolation factor value corresponding to the particular interpolation factor region.

Clause 172 includes the apparatus of any of Clause 140 to Clause 148, further including generating, at the device, an interpolation factor based on the motion metric, wherein the determination whether to use the motion-compensated frame interpolation to generate the intermediate frame is based on whether the interpolation factor satisfies an interpolation criterion.

Clause 173 includes the apparatus of Clause 172, wherein the interpolation factor is based on a comparison of the motion metric with interpolation factor determination data.

Clause 174 includes the apparatus of Clause 173, wherein the interpolation factor determination data is based on a configuration setting, default data, a user input, a detected context, an operation mode, a screen size, or a combination thereof.

Clause 175 includes the apparatus of Clause 173 or Clause 174, wherein the interpolation factor determination data is based on a configuration setting.

Clause 176 includes the apparatus of any of Clause 173 to Clause 175, wherein the interpolation factor determination data is based on default data.

Clause 177 includes the apparatus of any of Clause 173 to Clause 176, wherein the interpolation factor determination data is based on a user input.

Clause 178 includes the apparatus of any of Clause 173 to Clause 177, wherein the interpolation factor determination data is based on a detected context.

Clause 179 includes the apparatus of any of Clause 173 to Clause 178, wherein the interpolation factor determination data is based on an operation mode.

Clause 180 includes the apparatus of any of Clause 173 to Clause 179, wherein the interpolation factor determination data is based on a screen size.

Clause 181 includes the apparatus of any of Clause 173 to Clause 180, wherein the interpolation factor determination data indicates a plurality of interpolation factor regions defined by at least ranges of motion metric values, wherein each of the plurality of interpolation factor regions corresponds to a particular interpolation factor value, wherein the motion metric is included in a particular interpolation factor region of the plurality of interpolation factor regions, and wherein the interpolation factor has an interpolation factor value corresponding to the particular interpolation factor region.

Clause 182 includes the apparatus of any of Clause 140 to Clause 181, further including, in response to determining that an interpolation factor satisfies an interpolation criterion, using the motion-compensated frame interpolation to generate the intermediate frame.

Clause 183 includes the apparatus of any of Clause 140 to Clause 182, further including, in response to determining that an interpolation factor fails to satisfy an interpolation criterion, using an alternative to the motion-compensated frame interpolation to generate the intermediate frame.

Clause 184 includes the apparatus of any of Clause 140 to Clause 183, further including, in response to the determination that the motion-compensated frame interpolation is to be used to generate the intermediate frame and based on a determination that the motion data indicates a first motion between the first frame and the second frame, generating the intermediate frame so that second motion between the first frame and the intermediate frame is based on the first motion and an interpolation factor.

Clause 185 includes the apparatus of any of Clause 140 to Clause 183, wherein the means for generating the intermediate frame, in response to the determination that the motion-compensated frame interpolation is to be used to generate the intermediate frame and based on a determination that the motion data indicates a first motion between the first frame and the second frame, generate the intermediate frame so that second motion between the first frame and the intermediate frame is based on a predetermined weight applied to the first motion.

Clause 186 includes the apparatus of any of Clause 140 to Clause 185, wherein the means for generating the intermediate frame, in response to the determination that the motion-compensated frame interpolation is not to be used to generate the intermediate frame, generate the intermediate frame as a copy of one of the first frame or the second frame.

Clause 187 includes the apparatus of any of Clause 140 to Clause 186, further comprising means for receiving the input sequence of image frames.

Clause 188 includes the apparatus of any of Clause 140 to Clause 187, wherein the means for obtaining the motion data, the means for identifying any frame regions, the means for determining the motion metric, the means for performing the determination, the means for generating the intermediate frame, and the means for generating the output sequence are integrated into at least one of a communication device, a computer, a display device, a television, a gaming console, a digital video player, a camera, a navigation device, a vehicle, a headset, an augmented reality headset, a virtual reality headset, an aerial vehicle, a home automation system, a voice-activated device, an internet-of-things (IoT) device, a virtual reality (VR) device, a base station, or a mobile device.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, such implementation decisions are not to be interpreted as causing a departure from the scope of the present disclosure.

The steps of a method or algorithm described in connection with the implementations disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A device comprising:
   a memory configured to store instructions; and
   one or more processors configured to execute the instructions to:
   obtain motion data indicating estimated motion between a first frame and a second frame of an input sequence of image frames;
   identify, based on the motion data, any frame regions of the first frame that indicate motion greater than a motion threshold;
   determine, based on the motion data, a motion metric associated with the identified frame regions;
   perform a determination, based on the motion metric and a size metric associated with the identified frame regions, whether to use motion-compensated frame interpolation to generate an intermediate frame;
   generate the intermediate frame based on the determination; and
   generate an output sequence of image frames that includes the intermediate frame between the first frame and the second frame.

2. The device of claim 1, wherein the motion metric is based on an average motion, a maximum motion, a range of motion, or a combination thereof, associated with the identified frame regions.

3. The device of claim 1, wherein the size metric is based on a combined size of the identified frame regions, a count of the identified frame regions, a percentage of the first frame that includes the identified frame regions, or a combination thereof.

4. The device of claim 1, wherein the one or more processors are configured to generate an interpolation factor based on the size metric, and wherein the determination whether to use the motion-compensated frame interpolation to generate the intermediate frame is based on whether the interpolation factor satisfies an interpolation criterion.

5. The device of claim 4, wherein the one or more processors are further configured to generate the interpolation factor based on a comparison of the size metric with interpolation factor determination data.

6. The device of claim 5, wherein the interpolation factor determination data is based on a configuration setting, default data, a user input, a detected context, an operation mode, a screen size, or a combination thereof.

7. The device of claim 5, wherein the interpolation factor determination data indicates a plurality of interpolation factor regions defined by at least ranges of size metric values, wherein each of the plurality of interpolation factor regions corresponds to a particular interpolation factor value, and wherein the one or more processors are further configured to, based on determining that the size metric is included in a particular interpolation factor region of the plurality of interpolation factor regions, generate the interpolation factor having an interpolation factor value that corresponds to the particular interpolation factor region.

8. The device of claim 1, wherein the one or more processors are configured to generate an interpolation factor based on the motion metric, and wherein the determination whether to use the motion-compensated frame interpolation to generate the intermediate frame is based on whether the interpolation factor satisfies an interpolation criterion.

9. The device of claim 8, wherein the one or more processors are further configured to generate the interpolation factor based on a comparison of the motion metric with interpolation factor determination data.

10. The device of claim 9, wherein the interpolation factor determination data is based on a configuration setting, default data, a user input, a detected context, an operation mode, a screen size, or a combination thereof.

11. The device of claim 9, wherein the interpolation factor determination data indicates a plurality of interpolation factor regions defined by at least ranges of motion metric values, wherein each of the plurality of interpolation factor regions corresponds to a particular interpolation factor value, and wherein the one or more processors are further configured to, based on determining that the motion metric is included in a particular interpolation factor region of the plurality of interpolation factor regions, generate the interpolation factor having an interpolation factor value that corresponds to the particular interpolation factor region.

12. The device of claim 1, wherein the one or more processors are configured to, in response to determining that an interpolation factor satisfies an interpolation criterion, use the motion-compensated frame interpolation to generate the intermediate frame.

13. The device of claim 1, wherein the one or more processors are configured to, in response to determining that an interpolation factor fails to satisfy an interpolation criterion, use an alternative to the motion-compensated frame interpolation to generate the intermediate frame.

14. The device of claim 1, wherein the one or more processors are configured to, in response to the determination that the motion-compensated frame interpolation is to be used to generate the intermediate frame and based on a determination that the motion data indicates a first motion between the first frame and the second frame, generate the intermediate frame so that second motion between the first frame and the intermediate frame is based on the first motion and an interpolation factor.

15. The device of claim 1, wherein the one or more processors are configured to, in response to the determination that the motion-compensated frame interpolation is to be used to generate the intermediate frame and based on a determination that the motion data indicates a first motion between the first frame and the second frame, generate the intermediate frame so that second motion between the first frame and the intermediate frame is based on a predetermined weight applied to the first motion.

16. The device of claim 1, wherein the one or more processors are configured to, in response to the determination that the motion-compensated frame interpolation is not to be used to generate the intermediate frame, generate the intermediate frame as a copy of one of the first frame or the second frame.

17. The device of claim 1, further comprising a modem configured to receive the input sequence of image frames.

18. A method comprising:
  obtaining, at a device, motion data indicating estimated motion between a first frame and a second frame of an input sequence of image frames;
  identifying, based on the motion data, any frame regions of the first frame that indicate motion greater than a motion threshold;
  determining, based on the motion data, a motion metric associated with the identified frame regions;
  performing a determination, based on the motion metric and a size metric associated with the identified frame regions, whether to use motion-compensated frame interpolation to generate an intermediate frame;
  generating, at the device, the intermediate frame based on the determination; and
  generating, at the device, an output sequence of image frames that includes the intermediate frame between the first frame and the second frame.

19. The method of claim 18, wherein the motion metric is based on an average motion, a maximum motion, a range of motion, or a combination thereof, associated with the identified frame regions.

20. The method of claim 18, wherein the size metric is based on a combined size of the identified frame regions, a count of the identified frame regions, a percentage of the first frame that includes the identified frame regions, or a combination thereof.

21. The method of claim 18, further comprising generating, at the device, an interpolation factor based on the size metric and the motion metric, wherein the determination whether to use the motion-compensated frame interpolation to generate the intermediate frame is based on whether the interpolation factor satisfies an interpolation criterion.

22. The method of claim 21, wherein the interpolation factor is based on a comparison of the size metric and the motion metric with interpolation factor determination data.

23. The method of claim 22, wherein the interpolation factor determination data is based on a configuration setting, default data, a user input, a detected context, an operation mode, a screen size, or a combination thereof.

24. The method of claim 22, wherein the interpolation factor determination data indicates a plurality of interpolation factor regions defined by ranges of size metric values and ranges of motion metric values, wherein each of the plurality of interpolation factor regions corresponds to a particular interpolation factor value, wherein the motion metric and the size metric are included in a particular interpolation factor region of the plurality of interpolation factor regions, and wherein the interpolation factor has an interpolation factor value corresponding to the particular interpolation factor region.

25. The method of claim 21, further comprising, in response to determining that the interpolation factor satisfies the interpolation criterion, using the motion-compensated frame interpolation to generate the intermediate frame.

26. The method of claim 21, further comprising, in response to determining that the interpolation factor fails to satisfy the interpolation criterion, using an alternative to the motion-compensated frame interpolation to generate the intermediate frame.

27. The method of claim 21, further comprising, in response to the determination that the motion-compensated frame interpolation is to be used to generate the intermediate frame and based on a determination that the motion data indicates a first motion between the first frame and the second frame, generating the intermediate frame so that second motion between the first frame and the intermediate frame is based on the first motion and the interpolation factor.

28. A non-transitory computer-readable medium storing instructions that, when executed by one or more processors, cause the one or more processors to:
  obtain motion data indicating estimated motion between a first frame and a second frame of an input sequence of image frames;
  identify, based on the motion data, any frame regions of the first frame that indicate motion greater than a motion threshold;
  determine, based on the motion data, a motion metric associated with the identified frame regions;
  perform a determination, based on the motion metric and a size metric associated with the identified frame regions, whether to use motion-compensated frame interpolation to generate an intermediate frame;
  generate the intermediate frame based on the determination; and
  generate an output sequence of image frames that includes the intermediate frame between the first frame and the second frame.

29. An apparatus comprising:
  means for obtaining motion data indicating estimated motion between a first frame and a second frame of an input sequence of image frames;
  means for identifying, based on the motion data, any frame regions of the first frame that indicate motion greater than a motion threshold;
  means for determining, based on the motion data, a motion metric associated with the identified frame regions;

means for performing a determination, based on the motion metric and a size metric associated with the identified frame regions, whether to use motion-compensated frame interpolation to generate an intermediate frame;

means for generating the intermediate frame based on the determination; and means for generating an output sequence of image frames that includes the intermediate frame between the first frame and the second frame.

30. The apparatus of claim 29, wherein the means for obtaining the motion data, the means for identifying any frame regions, the means for determining the motion metric, the means for performing the determination, the means for generating the intermediate frame, and the means for generating the output sequence are integrated into at least one of a communication device, a computer, a display device, a television, a gaming console, a digital video player, a camera, a navigation device, a vehicle, a headset, an augmented reality headset, a virtual reality headset, an aerial vehicle, a home automation system, a voice-activated device, an internet-of-things (IoT) device, a virtual reality (VR) device, a base station, or a mobile device.

* * * * *